(12) United States Patent  
Chen et al.

(10) Patent No.: US 9,143,212 B2  
(45) Date of Patent: Sep. 22, 2015

(54) CODEBOOK SUB-SAMPLING FOR CSI FEEDBACK ON PUCCH FOR 4TX MIMO

(71) Applicant: Texas Instruments Incorporated, Dallas, TX (US)

(72) Inventors: Runhua Chen, Plano, TX (US); Eko Onggosanusi, Allen, TX (US); Ralf Bendlin, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/187,216

(22) Filed: Feb. 21, 2014

(65) Prior Publication Data

US 2014/0328422 A1 Nov. 6, 2014

Related U.S. Application Data

(60) Provisional application No. 61/768,857, filed on Feb. 25, 2013, provisional application No. 61/815,081, filed on Apr. 23, 2013, provisional application No. 61/823,663, filed on May 15, 2013, provisional application No. 61/826,137, filed on May 22, 2013, provisional application No. 61/828,072, filed on May 28, 2013.

(51) Int. Cl.
| | |
|---|---|
| *H04B 7/02* | (2006.01) |
| *H04B 7/04* | (2006.01) |
| *H04B 7/06* | (2006.01) |
| *H04W 36/00* | (2009.01) |

(52) U.S. Cl.
CPC ............ *H04B 7/0486* (2013.01); *H04B 7/0417* (2013.01); *H04B 7/065* (2013.01); *H04B 7/063* (2013.01); *H04B 7/0632* (2013.01); *H04B 7/0639* (2013.01); *H04W 36/0083* (2013.01)

(58) Field of Classification Search
CPC .................................................... H04B 7/0486
USPC ........................................................ 375/347
See application file for complete search history.

(56) References Cited

U.S. PATENT DOCUMENTS

| | | | |
|---|---|---|---|
| 2009/0046805 | A1 | 2/2009 | Kim et al. |
| 2009/0286482 | A1 | 11/2009 | Gorokhov et al. |
| 2011/0194638 | A1 | 8/2011 | Erell et al. |
| 2012/0003945 | A1 | 1/2012 | Liu et al. |
| 2012/0134434 | A1 | 5/2012 | Chen et al. |
| 2012/0218948 | A1 | 8/2012 | Onggosanusi et al. |

*Primary Examiner* — Lihong Yu  
(74) *Attorney, Agent, or Firm* — Ronald O. Neerings; Frank D. Cimino

(57) ABSTRACT

Channel state information (CSI) feedback in a wireless communication system is disclosed. User equipment transmits a CSI feedback signal via a Physical Uplink Control CHannel (PUCCH). If the UE is configured in a first feedback mode, the CSI comprises a first report jointly coding a Rank Indicator (RI) and a first precoding matrix indicator (PMI1), and a second report coding Channel Quality Indicator (CQI) and a second precoding matrix indicator (PMI2). If the UE is configured in a second feedback mode, the CSI comprises a first report coding RI, and a second report coding CQI, PMI1 and PMI2. The jointly coded RI and PMI1 employs codebook sub-sampling, and the jointly coding PMI1, PMI2 and CQI employs codebook sub-sampling.

15 Claims, 4 Drawing Sheets

CODEBOOK SUB-SAMPLING FOR CSI FEEDBACK ON PUCCH FOR 4TX MIMO

CROSS-REFERENCE TO RELATED APPLICATIONS

This application claims the benefit of the filing date of U.S. Provisional Patent Application No. 61/768,857, filed on Feb. 25, 2013; U.S. Provisional Patent Application No. 61/815, 081, filed on Apr. 23, 2013; U.S. Provisional Patent Application No. 61/823,663, filed on May 15, 2013; U.S. Provisional Patent Application No. 61/826,137, filed on May 22, 2013; U.S. Provisional Patent Application No. 61/828,072, filed on May 28, 2013, all titled "Codebook Sub-Sampling for CSI Feedback on PUCCH for 4Tx MIMO," the disclosures of which are hereby incorporated by reference herein in their entirety.

TECHNICAL FIELD

The technical field of this invention is wireless communication such as wireless telephony.

BACKGROUND

The present embodiments relate to wireless communication systems and, more particularly, to the precoding of Physical Downlink Shared Channel (PDSCH) data and the associated demodulation reference signals with codebook-based feedback for multi-input multi-output (MIMO) transmissions.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Channel State Information Reference Signals (CSI-RS) and Dedicated or Demodulation Reference Signals (DMRS). These reference signals are useful for channel estimation at the receiver.

In multi-input multi-output (MIMO) communication systems with multiple transmit/receive antennas, the data transmission is performed via precoding. Here, precoding refers to a linear (matrix) transformation of L-stream data into P-stream where L denotes the number of layers (also termed the transmission rank) and P denotes the number of transmit antennas. With the use of dedicated (i.e. user-specific) DMRS, a transmitter, such as a base station or eNB (eNB), can perform precoding operations that are transparent to user equipment (UE) acting as receivers. It is beneficial for the base station to obtain a precoding matrix recommendation from the user equipment. This is particularly the case for frequency-division duplexing (FDD) where the uplink and downlink channels occupy different parts of the frequency bands, i.e. the uplink and downlink are not reciprocal. Hence, a codebook-based feedback from the UE to the eNB is preferred. To enable a codebook-based feedback, a precoding codebook needs to be designed.

The 3GPP Long-Term Evolution (LTE) specification includes codebooks for 2-antenna, 4-antenna, and 8-antenna transmissions. While those codebooks are designed efficiently, the present inventors recognize that still further improvements in downlink (DL) spectral efficiency are possible. Accordingly, the preferred embodiments described below are directed toward these problems as well as improving upon the prior art.

SUMMARY

Systems and methods for channel state information (CSI) and precoding matrix indicator (PMI) feedback in a wireless communication system are disclosed. A precoding matrix is generated for multi-antenna transmission based on a precoding matrix indicator (PMI) feedback from at least one remote receiver wherein the PMI indicates a choice of precoding matrix derived from a matrix multiplication of two matrices from a first codebook and a second codebook, respectively. One or more layers of a data stream are precoded with the precoding matrix and transmitted to the remote receiver.

In one embodiment, Channel state information (CSI) feedback is transmitted by user equipment in a wireless communication system. The user equipment transmits a CSI feedback signal via a Physical Uplink Control CHannel (PUCCH). If the UE is configured in a first feedback mode, the CSI comprises a first report jointly coding a Rank Indicator (RI) and a first precoding matrix indicator (PMI1), and a second report coding Channel Quality Indicator (CQI) and a second precoding matrix indicator (PMI2). If the UE is configured in a second feedback mode, the CSI comprises a first report coding RI, and a second report coding CQI, PMI1 and PMI2. The jointly coding RI and PMI1 employs codebook sub-sampling, and the jointly coding PMI1, PMI2 and CQI employs codebook sub-sampling. If submode 1 is selected RI and W1 are jointly encoded using codebook sub sampling in report 1. If submode 2 is selected W1 and W2 are jointly encoded using codebook sub sampling in report 2.

BRIEF DESCRIPTION OF THE DRAWINGS

These and other aspects of this invention are illustrated in the drawings, in which.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Figure 1:
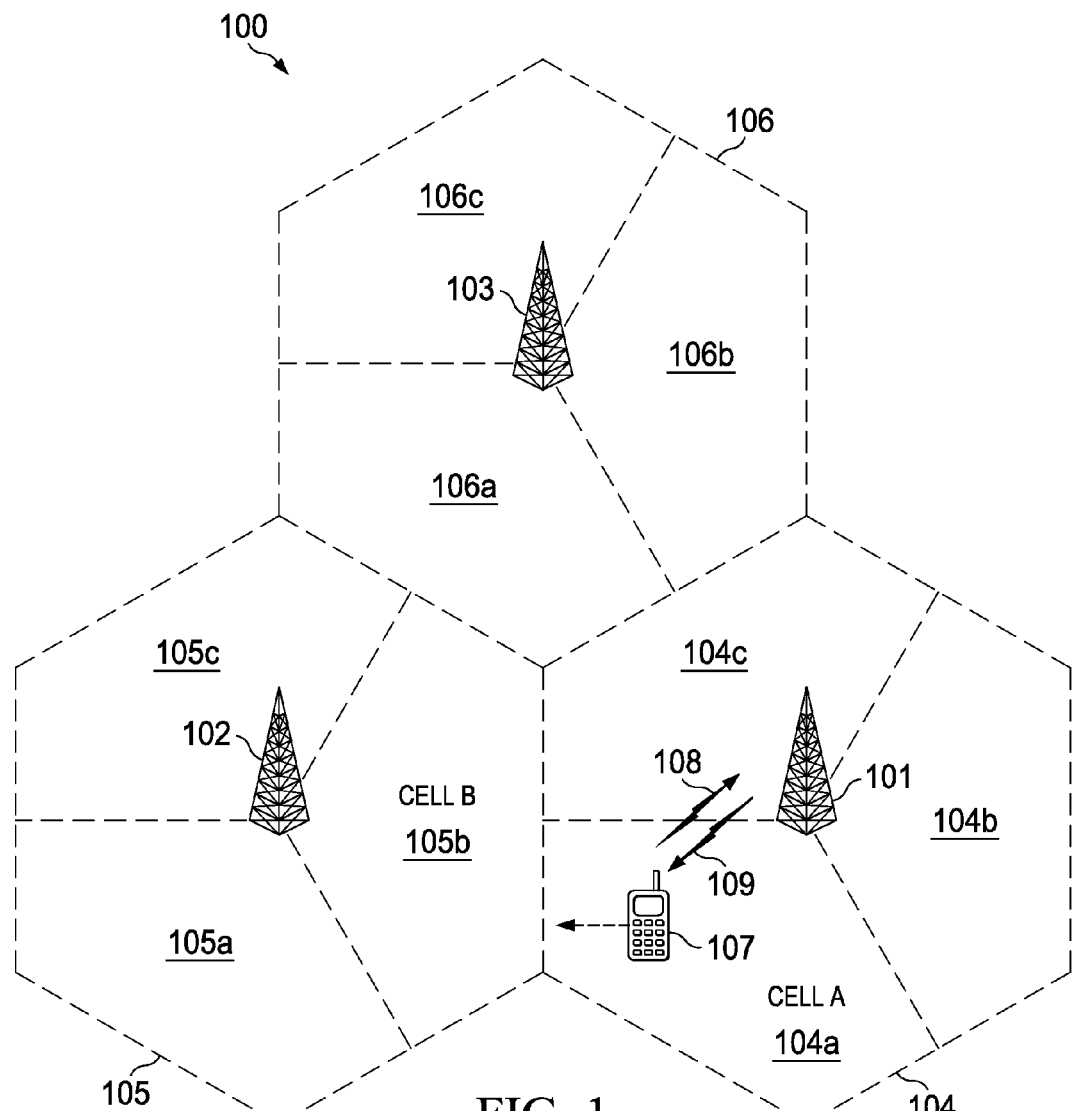
FIG. 1 illustrates an exemplary wireless telecommunications network 100.

FIG. 1 illustrates an exemplary wireless telecommunications network 100. Network 100 includes a plurality of base stations 101, 102 and 103. In operation, a telecommunications network necessarily includes many more base stations. Each base station 101, 102 and 103 (eNB) is operable over corresponding coverage areas 104, 105 and 106. Each base station's coverage area is further divided into cells. In the illustrated network, each base station's coverage area is divided into three cells 104a-c, 105a-c, 106a-c. User equipment (UE) 107, such as telephone handset, is shown in Cell A 104a. Cell A 104a is within coverage area 104 of base station 101. Base station 101 transmits to and receives transmissions from UE 107. As UE 107 moves out of Cell A 104a and into Cell B 105b, UE 107 may be handed over to base station 102. Because UE 107 is synchronized with base station 101, UE 107 can employ non-synchronized random access to initiate handover to base station 102.

Non-synchronized UE 107 also employs non-synchronous random access to request allocation of uplink 108 time or frequency or code resources. If UE 107 has data ready for transmission, which may be traffic data, measurements report, tracking area update, UE 107 can transmit a random access signal on uplink 108. The random access signal notifies base station 101 that UE 107 requires uplink resources to transmit the UEs data. Base station 101 responds by transmitting to UE 107 via downlink 109, a message containing the parameters of the resources allocated for UE 107 uplink transmission along with a possible timing error correction. After receiving the resource allocation and a possible timing advance message transmitted on downlink 109 by base station 101, UE 107 optionally adjusts its transmit timing and transmits the data on uplink 108 employing the allotted resources during the prescribed time interval.

Base station 101 configures UE 107 for periodic uplink Sounding Reference Signal (SRS) transmission. Base station 101 estimates uplink channel state information (CSI) from the SRS transmission. The preferred embodiments of the present invention provide improved communication through precoded multi-antenna transmission with codebook-based feedback. In a cellular communication system, a UE is uniquely connected to and served by a single cellular base station or eNB at a given time. An example of such a system is the 3GPP LTE system, which includes the LTE-Advanced (LTE-A) system. With an increasing number of transmit antennas at the eNB, the task of designing an efficient codebook with desirable properties is challenging.

For downlink data transmission in a cellular communication system, a UE measures the downlink wireless channel via downlink reference signals and reports the measured Channel State Information (CSI) to the eNB. The eNB utilizes the CSI report to perform downlink link adaptation and scheduling to determine data transmission schemes to the UE, including but not limited to time/frequency resource assignment, modulation and coding schemes. The reference signals used by UE for channel estimation can be cell-specific reference signal (CRS) or Channel-State-Information Reference Signals (CSI-RS) in LTE. CSI is reported in the form of a set of recommended MIMO transmission properties to the eNB. CSI consists of Channel Quality Indicator (CQI), precoding matrix indicator (PMI), precoding type indicator (PTI), and/or rank indication (RI). RI indicates the number of data layers that the UE recommends the eNB to transmit. PMI is the index to a recommended precoding matrix in a pre-determined codebook known to the eNB and the UE in advance. CQI reflects the channel quality that the UE expects to experience if the recommended RI/PMI is used for data transmission. The time and frequency resources that can be used by the UE to report CSI are controlled by the eNB. A UE is semi-statically configured by higher layers to periodically feedback different CSI components (CQI, PMI, PTI, and/or RI) on the Physical Uplink Control CHannel (PUCCH). Different PUCCH modes can be configured for CSI feedback.

In one embodiment, a dual-stage codebook for CSI feedback is based on the product structure proposed in:

$$W = W_1 W_2 \quad (1)$$

where W1 targets wideband/long-term channel properties and W2 targets frequency-selective/short-term channel properties. Each of the components W1, W2 is assigned a codebook. Hence, two distinct codebooks are needed: $CB_1$ and $CB_2$. W is termed the composite precoder. The choice of W1 and W2 are indicated via $PMI_1$ and $PMI_2$, respectively.

The LTE Release 8 4Tx codebook is used for channel feedback to a 4-antenna base station and is designed using the Householder structure, wherein a codebook of rank r (r=1, 2, 3, 4) comprises sixteen precoding matrices that incur 4-bits of feedback overhead. For LTE Release 12, the 4Tx codebook may be enhanced to a larger codebook size. In order to avoid substantially increasing the feedback overhead, the LTE Release 12 4Tx codebook may be enhanced using a double codebook structure such as used in the codebook adopted for 8Tx MIMO in LTE Release 10, wherein each precoding matrix is expressed as W=W1W2. Herein W denotes the composite precoding matrix, W1 is a wideband first precoding matrix corresponding to a wideband/long-term channel property, and W2 is a narrow-band second precoding matrix corresponding to a short-term/narrow-band channel property. Because W1 needs to be reported only once for the entire system bandwidth, the feedback overhead can be effectively limited even if the composite codebook (W) size is substantially larger than the LTE Release 8 codebook. In addition, as W1 reflects the long-term channel characteristics, it can be fed back at a substantially lower rate than W2 that targets the short-term channel property.

The enhanced 4Tx codebook in LTE Release 12 is designed with the double-codebook structure. For rank-1/2, both W1 and W2 codebook are of size 4-bit comprises sixteen precoders. For rank-3/4, Rel.8 codebook is reused such that the W1 codebook comprises a single 4×4 identity matrix, and the W2 codebook reuses the Rel.8 codebook, i.e. 16 precoders per rank. As such, the total payload of W1+W2 are 8/8/4/4 bits for rank-1/2/3/4. Since the maximum PUCCH payload is 11 bits, codebook sub-sampling needs to be implemented in order to meet the PUCCH payload limitation. This disclosure outlines codebook sub-sampling mechanisms in relation to PUCCH mode 1-1, for submode 1 and submode 2, and PUCCH mode 2-1.

Submode 1: W1 and W2 are reported in different time instances (e.g., in different subframes).

Submode 2: W1 and W2 are reported in the same time instances (e.g., in the same subframe).

Table 1 is a reporting structure for PUCCH mode 1-1. Table entries having the form x+y indicate the possibility for joint encoding. Each CSI report, report 1 or report 2, is transmitted over one PUCCH in one subframe of 1 ms duration. The maximum payload of PUCCH is 11-bit; hence any CSI feedback on PUCCH should not exceed the 11-bit payload limitation. The total CSI payload depends on the contents of CSI reported on the PUCCH, e.g. RI, W1, W2, CQI or a combination thereof. For 4Tx MIMO channel, the maximum rank (RI) reported by the UE is 2 for a UE capable of maximum 2-layer data communication, and 4 for a UE capable of maximum 4-layer data communication. Hence, the RI bit-width is 1-bit or 2-bit, for UE capable of 2-layer or 4-layer communication, respectively. The CQI bit-width is a function of PUCCH mode and the RI. If RI=1, the UE reports one CQI for single layer data communication, using 4-bit. For RI greater than 1, the UE reports two CQIs for two data codewords. The first CQI for the first codeword has 4-bits, and the CQI for the second codeword is encoded differentially with respect to the CQI of the first codeword using 3-bits. Hence, the total CQI overhead is 4-bits for RI=1 and 7-bits for RI>1. The bit-width for W1 and W2 depends on the codebook size, and may be different for different ranks. For instance, if the un-sub-sampled W1 codebook is 4-bit and the un-sub-sampled W1 codebook is 4-bit, the total payload of CQI+W1+W2 without codebook sub-sampling is 7+8=15 bits for report 2 of PUCCH mode 1-1 submode 2, exceeding the 11-bit PUCCH payload. Hence, codebook sub-sampling is required where the UE performs PMI selection within a sub-sampled codebook of smaller-size, instead of the full 4-bit W1 and 4-bit W2 codebook.

TABLE 1

|  | Submode 1 | Submode 2 |
| --- | --- | --- |
| Report 1 | RI + W1 | RI |
| Report 2 | CQI, W2 | CQI, W1 + W2 |

The following is apparent from Table 1. For submode 1, report 2 simply follows the LTE Release 8 PMI principle where W2 is analogous to the LTE Release 8 PMI. Hence, there is no need to perform codebook sub-sampling, unless the payload associated with W2 exceeds 4-bits. For submode 2, report 1 carries only the LTE Release 8 RI. Hence, codebook sub-sampling is irrelevant here. Codebook sub-sampling is needed for Submode 1/Report 1 and Submode 2/Report 2. This is discussed below.

Figure 2:
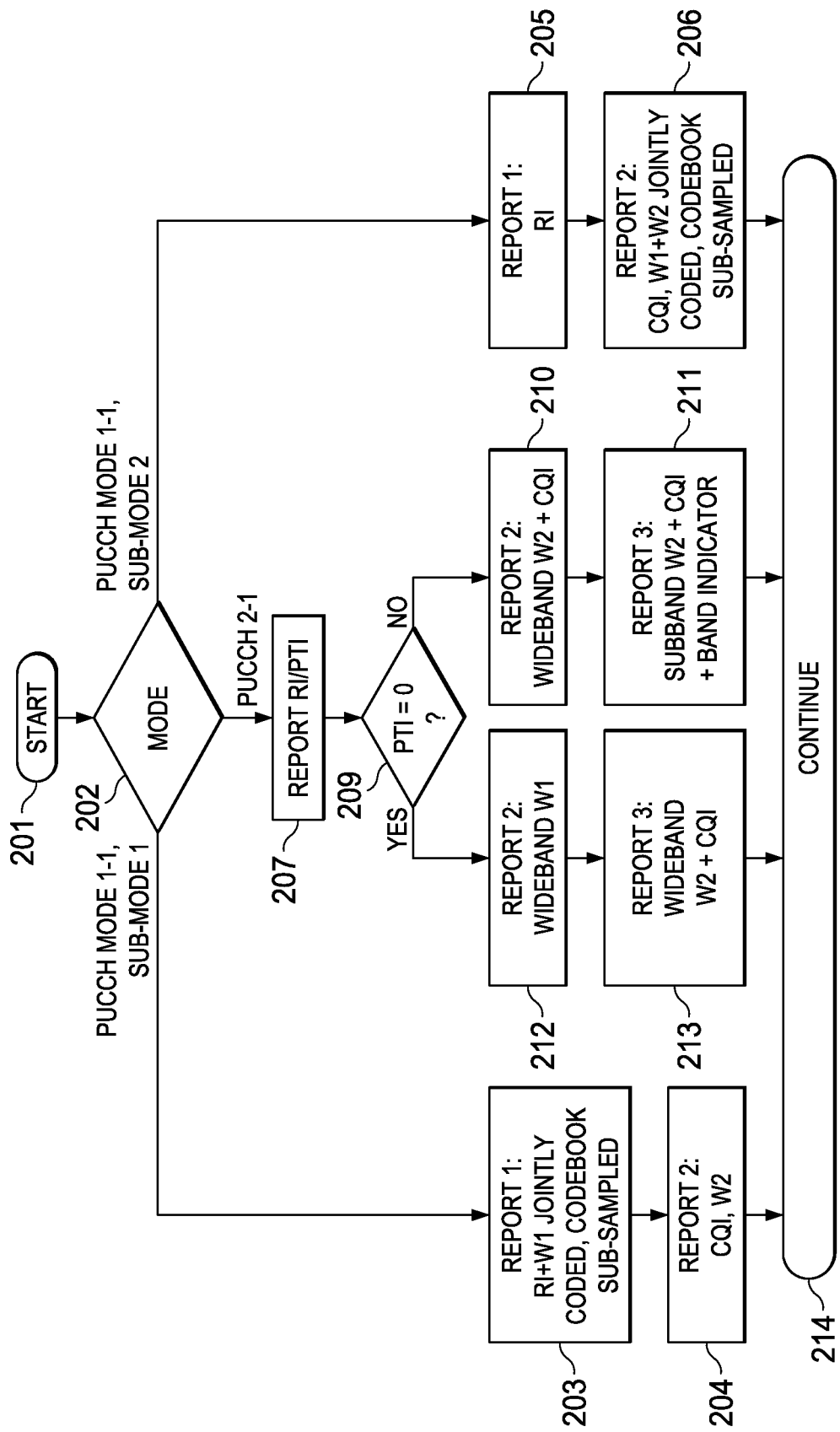
FIG. 2 is a flowchart illustrating a reporting process according to an example embodiment.
Figure 4A:
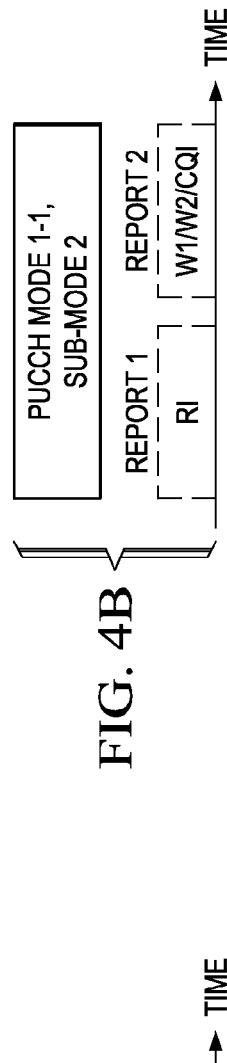
FIG. 4A illustrates the time domain reporting sequence of PUCCH mode 1-1 submode 1.

FIG. 2 is a flowchart illustrating a reporting process according to an example embodiment. FIG. 2 begins with start block 201. Test block 202 determines if PUCCH mode 1-1 submode 1, PUCCH mode 1-1 submode 2, or PUCCH mode 2-1 is selected. If PUCCH mode 1-1 submode 1 is selected, then block 203 generates report 1 and RI and W1 are jointly encoded. They are also codebook sub-sampled according to one of the tables below. Block 204 generates report 2 with CQI and W2 separately encoded. The time domain reporting sequence of PUCCH mode 1-1 submode 1 is illustrated in FIG. 4A.

Figure 4B:
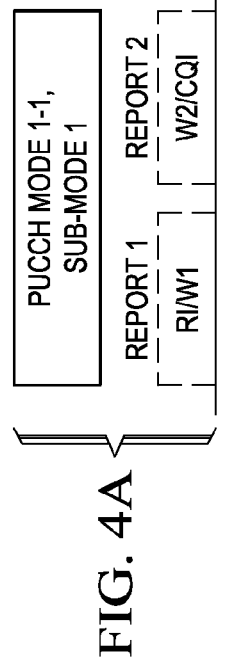
FIG. 4B illustrates the time domain reporting sequence of PUCCH mode 1-1 submode 2.

If PUCCH mode 1-1 submode 2 is selected in block 202, then block 205 generates report 1. This includes the separately encoded RI. Block 206 generates report 2 with CQI, W1 and W2. W1 and W2 are jointly encoded with codebook sub-sampling according to one of the tables below. The time domain reporting sequence of PUCCH mode 1-1 submode 2 is illustrated in FIG. 4B.

Figure 4C:
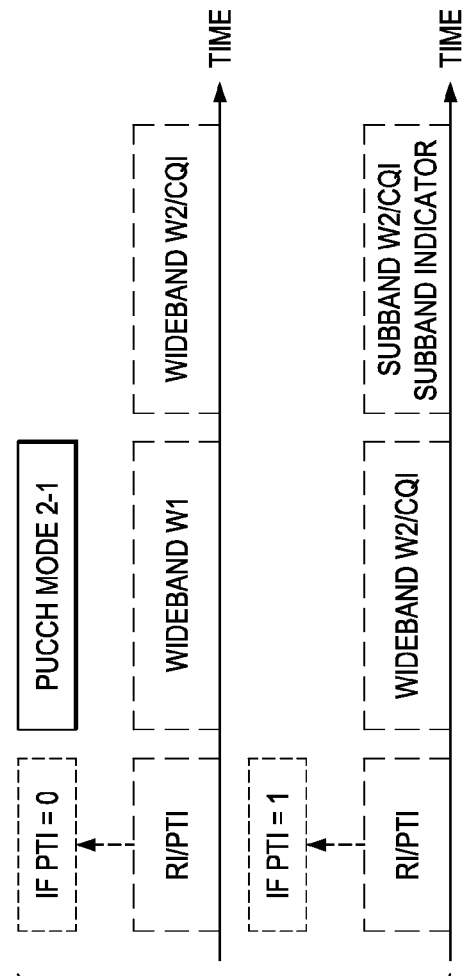
FIG. 4C illustrates the time domain reporting sequence of PUCCH mode 2-1.

If PUCCH mode 2-1 is selected in block 202, then block 207 generates report 1 comprising RI and a precoding type indicator (PTI). The value of PTI is checked in block 209. If PTI=0, then block 210 generates report 2 comprising a wideband W1, and block 211 generates report 3 comprising a wideband W2 and CQI. If PTI=1 in block 209, then block 212 generates report 2 comprising a wideband W2 and CQI, and block 213 generates a subband W2, subband CQI and a band indicator indicating the position of the subband. Subband W2, subband CQI and subband indicator are encoded with W2 codebook sub-sampling according to of the tables below. The time domain reporting sequence of PUCCH mode 2-1 is illustrated in FIG. 4C.

FIG. 2 ends with continue block 213.

Codebook Enhancement.

An enhanced 4Tx codebook that can be used with this reporting structure is disclosed in pending U.S. patent application Ser. No. 14/177,547 entitled "4TX Codebook Enhancement in LTE," filed Feb. 11, 2014, the disclosure of which is hereby incorporated by reference herein in its entirety.

Details of the proposed codebook enhancements can be found in U.S. application Ser. No. 14/177,547, wherein the LTE Release 8 codebook is augmented by enhanced codebook components designed according to the Grid-of-Beam (GoB) structure. For reference, the codebooks proposed in U.S. application Ser. No. 14/177,547 are re-captured below, which will be used for the PUCCH sub-sampling discussion below.

With the GoB component, each precoder W is denoted as W=W1W2.

Precoding subspace for W1 is over-sampled by N discrete Fourier transform (DFT) beams.

Each wideband W1 comprises Nb adjacent or non-adjacent beams to cover a specific angle of departure (AoD) and angular spread. Different W1 matrices may or may not have overlapping Nb/2 DFT beams.

Narrowband W2 performs beam selection and co-phasing.

For a GoB codebook without overlap, the following matrices are given in order to describe the codebook:

$$B = [\, b_0 \quad b_1 \quad \ldots \quad b_{N-1} \,] \tag{1}$$

$$[B]_{1+m, 1+n} = e^{j\frac{2\pi mn}{N}}, \tag{2}$$

$$m = 0, 1$$

$$n = 0, 1, \ldots, N-1$$

$$X^{(k)} \in \{[\, b_{(N_b k) \bmod N} \quad b_{(N_b k+1) \bmod N} \quad \ldots \quad b_{(N_b k + N_b - 1) \bmod N} \,]: \tag{3}$$
$$k = 0, \ldots N/N_b - 1\}$$

For a GoB codebook with overlap, the following matrices are given in order to describe the codebook:

$$B = [\, b_0 \quad b_1 \quad \ldots \quad b_{N-1} \,] \tag{4}$$

$$[B]_{1+m, 1+n} = e^{j\frac{2\pi mn}{N}}, \tag{5}$$

$$m = 0, 1$$

$$n = 0, 1, \ldots, N-1$$

$$X^{(k)} \in \{[\, b_{(N_b k/2) \bmod N} \quad b_{(N_b k/2+1) \bmod N} \quad \ldots \quad b_{(N_b k/2 + N_b - 1) \bmod N} \,]: \tag{6}$$
$$k = 0, \ldots 2N/N_b - 1\}$$

Enhanced Codebook 1.

In one embodiment, the LTE Release 8 4Tx codebook is augmented by GoB components of (N,Nb)=(16,4), without adjacent W1 overlapping.

Rank-1:

$$W_1 \in C_1 = \tag{7}$$

$$\left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\} \rightarrow$$

size-5 (*LTE* Release 8 codebook augmented with block diagonal *GoB*).

When $W_1 = I_4$: $W_2 \in C_{2,R8Tx4r1}$, where $C_{2,R8Tx4r1}$ denotes the LTE Release 8 4Tx Rank-1 codebook used for W2.

When $$W_1 = \begin{bmatrix} X^{(k)} & 0 \\ 0 & X^{(k)} \end{bmatrix} (k = 0, 1, 2, 3): \quad (8)$$

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\} \quad (9)$$

Rank2:

$$W_1 \in C_1 = \quad (10)$$

$$\left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\} \rightarrow$$

size-5 (*LTE* Release 8 codebook augmented with block diagonal *GoB*).

When $W_1 = I_4$: $W_2 \in C_{2,R8Tx4r2}$, where $C_{2,R8Tx4r2}$ denotes the LTE Release 8 4Tx Rank-2 codebook used for W2.

When $$W_1 = \begin{bmatrix} X^{(k)} & 0 \\ 0 & X^{(k)} \end{bmatrix} (k = 0, 1, 2, 3): \quad (11)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$$(Y_1, Y_2) \in \{(e_1^4, e_1^4), (e_2^4, e_2^4), (e_3^4, e_3^4), \quad (12)$$
$$(e_4^4, e_4^4), (e_1^4, e_2^4), (e_2^4, e_3^4), (e_1^4, e_4^4), (e_2^4, e_4^4)\}$$

For Rank-3 and Rank-4, reuse the LTE Release 8 codebook.

This design can be extended to include adjacent overlapping W1:

Rank1:

$$W_1 \in C_1 = \left\{ I_4, \begin{bmatrix} X^{(0)} & 0 \\ 0 & X^{(0)} \end{bmatrix}, \dots, \begin{bmatrix} X^{(7)} & 0 \\ 0 & X^{(7)} \end{bmatrix} \right\} \quad (13)$$

Rank2:

$$W_1 \in C_1 = \left\{ I_4, \begin{bmatrix} X^{(0)} & 0 \\ 0 & X^{(0)} \end{bmatrix}, \dots, \begin{bmatrix} X^{(7)} & 0 \\ 0 & X^{(7)} \end{bmatrix} \right\} \quad (14)$$

where the C2 codebook remains the same.

Enhanced Codebook 2.

In one embodiment, the LTE Release 8 4-Tx codebook is augmented by GoB components of (N,Nb)=(16,4), without adjacent W1 overlapping. The LTE Release 8 4Tx codebook is not included in the LTE Release 12 4Tx codebook.

Rank-1:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\} \rightarrow \text{size-4} \quad (15)$$

When $$W_1 = \begin{bmatrix} X^{(k)} & 0 \\ 0 & X^{(k)} \end{bmatrix} (k = 0, 1, 2, 3): \quad (16)$$

$$W_2 \in CB_2 =$$
$$\left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\} \quad (17)$$

Rank 2:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\} \rightarrow \text{size-4} \quad (18)$$

When $$W_1 = \begin{bmatrix} X^{(k)} & 0 \\ 0 & X^{(k)} \end{bmatrix} (k = 0, 1, 2, 3): \quad (19)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$$(Y_1, Y_2) \in \{(e_1^4, e_1^4), (e_2^4, e_2^4), (e_3^4, e_3^4), \quad (20)$$
$$(e_4^4, e_4^4), (e_1^4, e_2^4), (e_2^4, e_3^4), (e_1^4, e_4^4), (e_2^4, e_4^4)\}$$

For Rank-3 and Rank-4, reuse the LTE Release 8 codebook.

This design may be extended to include adjacent overlapping W1:

Rank1:

$$W_1 \in C_1 = \left\{ \begin{bmatrix} X^{(0)} & 0 \\ 0 & X^{(0)} \end{bmatrix}, \dots, \begin{bmatrix} X^{(7)} & 0 \\ 0 & X^{(7)} \end{bmatrix} \right\} \quad (21)$$

Rank2:

$$W_1 \in C_1 = \left\{ \begin{bmatrix} X^{(0)} & 0 \\ 0 & X^{(0)} \end{bmatrix}, \dots, \begin{bmatrix} X^{(7)} & 0 \\ 0 & X^{(7)} \end{bmatrix} \right\} \quad (22)$$

The C2 codebook remains the same.

Enhanced Codebook 3.

In yet another embodiment, the Rank-1 and Rank-2 codebooks are the same as enhanced codebook 1, while the Rank-3 and Rank-4 codebooks are enhanced using a (N,Nb)=(4,4) GoB structure.

Rank-3:

$$W_1 \in C_1 = \left\{ I_4, \begin{bmatrix} X^{(0)} & 0 \\ 0 & X^{(0)} \end{bmatrix} \right\} \rightarrow \quad (23)$$

size-2 (*Rel*-8 codebook augmented with block diagonal *GoB*).

When $W_1=I_4$: $W_2 \in C_{2,R8Tx4r3}$, where $C_{2,R8Tx4r3}$ denotes the LTE Release 8 4Tx Rank-3 codebook used for W2.
When $$W_1 = \begin{bmatrix} X^{(k)} & 0 \\ 0 & X^{(k)} \end{bmatrix} (k = 0): \quad (24)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

and $$(Y_1, Y_2) \in \left\{ \begin{array}{l} (e_1^4, [e_1^4, e_3^4]), (e_2^4, [e_2^4, e_4^4]), (e_3^4, [e_1^4, e_3^4]), (e_4^4, [e_2^4, e_4^4]), \\ ([e_1^4, e_3^4], e_1^4), ([e_2^4, e_4^4], e_2^4), ([e_1^4, e_3^4], e_3^4), ([e_2^4, e_4^4], e_4^4) \end{array} \right\} \quad (25)$$

Rank-4:

$$W_1 \in C_1 = \left\{ I_4, \begin{bmatrix} X^{(0)} & 0 \\ 0 & X^{(0)} \end{bmatrix} \right\} \rightarrow \quad (26)$$

Size-2 (*Rel*-8 codebook augmented with block diagonal *GoB*).

When $W_1=I_4$: $W_2 \in C_{2,R8Tx4r4}$, where $C_{2,R8Tx4r4}$ denotes the LTE Release 8 4Tx Rank-4 codebook used for W2.
When $$W_1 = \begin{bmatrix} X^{(k)} & 0 \\ 0 & X^{(k)} \end{bmatrix} (k = 0): \quad (27)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

where $$(Y_1, Y_2) \in \left\{ \begin{array}{l} ([e_1^4, e_3^4], [e_1^4, e_3^4]), ([e_2^4, e_4^4], [e_2^4, e_4^4]), \\ ([e_1^4, e_3^4], [e_2^4, e_4^4]), ([e_2^4, e_4^4], [e_1^4, e_3^4]) \end{array} \right\} \quad (28)$$

corresponding to $i_1=0 \ldots 7$.
W2 can be reserved for $i_2=8 \ldots 15$.
Enhanced Codebook 4.

In yet another embodiment, the Rank-1 and Rank-2 codebooks are the same as enhanced codebook 2, while the Rank-3 and Rank-4 codebooks are enhanced using (N,Nb)= (4,4) GoB design.
Rank-3:

$$W_1 \in C_1 = \left\{ I_4, \begin{bmatrix} X^{(0)} & 0 \\ 0 & X^{(0)} \end{bmatrix} \right\} \rightarrow \quad (29)$$

size-2 (*Rel*-8 codebook augmented with block diagonal *GoB*).

When $W_1=I_4$: $W_2 \in C_{2,R8Tx4r3}$, where $C_{2,R8Tx4r3}$ denotes the LTE Release 8 4Tx Rank-3 codebook used for W2.
When $$W_1 = \begin{bmatrix} X^{(k)} & 0 \\ 0 & X^{(k)} \end{bmatrix} (k = 0): \quad (30)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$$(Y_1, Y_2) \in \left\{ \begin{array}{l} (e_1^4, [e_1^4, e_3^4]), (e_2^4, [e_2^4, e_4^4]), (e_3^4, [e_1^4, e_3^4]), (e_4^4, [e_2^4, e_4^4]), \\ ([e_1^4, e_3^4], e_1^4), ([e_2^4, e_4^4], e_2^4), ([e_1^4, e_3^4], e_3^4), ([e_2^4, e_4^4], e_4^4) \end{array} \right\} \quad (31)$$

Rank-4:

$$W_1 \in C_1 = \left\{ I_4, \begin{bmatrix} X^{(0)} & 0 \\ 0 & X^{(0)} \end{bmatrix} \right\} \rightarrow \quad (32)$$

Size-2 (*Rel*-8 codebook augmented with block diagonal *GoB*).

When $W_1=I_4$: $W_2 \in C_{2,R8Tx4r4}$, where $C_{2,R8Tx4r4}$ denotes the LTE Release 8 4Tx Rank-4 codebook used for W2.
When $$W_1 = \begin{bmatrix} X^{(k)} & 0 \\ 0 & X^{(k)} \end{bmatrix} (k = 0): \quad (33)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

where $$(Y_1, Y_2) \in \left\{ \begin{array}{l} ([e_1^4, e_3^4], [e_1^4, e_3^4]), ([e_2^4, e_4^4], [e_2^4, e_4^4]), \\ ([e_1^4, e_3^4], [e_2^4, e_4^4]), ([e_2^4, e_4^4], [e_1^4, e_3^4]) \end{array} \right\}, \quad (34)$$

corresponding to $i_1=0 \ldots 7$.
W2 can be reserved for $i_2=8 \ldots 15$.
Codebook Sub-Sampling Submode 1 (RI+W1)

In this case, the total payload RI+W1 is kept small to ensure that the effect of error propagation is not significant for any practical range of RI reporting interval. Hence, the following actions are performed to attain this goal when sub-sampling is performed on the codebook C1 for W1:

Joint encoding of RI and W1;
W1=I$_4$ matrix should not be sub-sampled. In other words, the sub-sampled W1 codebook (C1) shall comprise the 4×4 identity matrix;
Overlapping beams between two different W1 matrices, if they exist, can be skipped; and
Since precoding gain is expected to be small for higher-rank transmission (rank>2), fixed precoding (using only one W1 matrix) should also be considered whenever appropriate. This applies if the LTE Release 12 4Tx codebook does not re-use the LTE Release 8 codebook for high ranks (e.g., rank 3 and 4).

Keeping the above principles in mind, three exemplary W1 codebook sub-sampling schemes are given below in the tables listed in this section. The examples are ordered with the increasing total number of hypotheses. Note that it is possible to combine a part of one example with other part(s) from other examples.

Sub-Sampling for Enhanced Codebook 1.
For the enhanced codebook 1 above, the following sub-sampling scheme is proposed.

Tables 2 and 3 illustrate a sub-sampling of codebook C1 for enhanced codebook 1 above.

TABLE 2

| RI | Chosen W1 index for sub-sampling ($i_1$) | Number of W1 hypotheses |
|---|---|---|
| 1 | 0, 1, 2, 3, 4, | 5 |
| 2 | 0, 1, 2, 3, 4 | 5 |
| 3 | 0 (fixed precoding) | 1 |
| 4 | 0 (fixed precoding) | 1 |
| Total number of hypotheses across ranks: | | 10 → 4 bits for UE capable of 2-layers 12 → 4 bits for UE capable of 4-layers |

TABLE 3

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16 | 3 | $2(I_{RI/PMI1}-16)$ |
| 17 | 4 | $2(I_{RI/PMI1}-17)$ |
| 18-31 | reserved | NA |

If W1 overlapping is introduced for the GoB components, the following sub-sampling schemes are proposed.

Table 4 is a sub-sampling of codebook C1 for enhanced codebook 1 above, with W1 overlapping.

TABLE 4

| RI | Chosen W1 index for sub-sampling ($i_1$) | Number of W1 hypotheses |
|---|---|---|
| 1 | 0, 1, 3, 5, 7, | 5 |
| 2 | 0, 1, 3, 5, 7 | 5 |
| 3 | 0 (fixed precoding) | 1 |
| 4 | 0 (fixed precoding) | 1 |
| Total number of hypotheses across ranks: | | 10 → 4 bits for UE capable of 2-layers 12 → 4 bits for UE capable of 4-layers |

Alternatively the sub-sampled C1 codebook may replace codeword $i_1=1, 3, 5, 7$ with $i_1=2, 4, 6, 8$, for either/both Rank-1 and rank-2.

Sub-Sampling for Enhanced Codebook 2.

For enhanced codebook 2, the following sub-sampling scheme is proposed.

Table 5 illustrates sub-sampling of codebook C1 for enhanced codebook 2.

TABLE 5

| RI | Chosen W1 index for sub-sampling ($i_1$) | Number of W1 hypotheses |
|---|---|---|
| 1 | 0, 1, 2, 3 | 4 |
| 2 | 0, 1, 2, 3 | 4 |
| 3 | 0 (fixed precoding) | 1 |
| 4 | 0 (fixed precoding) | 1 |
| Total number of hypotheses across ranks: | | 8 → 3 bits for UE capable of 2-layers 10 → 4 bits for UE capable of 4-layers |

If W1 overlapping is introduced for the GoB components, the following sub-sampling schemes are proposed.

Table 6 illustrates sub-sampling of codebook C1 for enhanced codebook 2 with W1 overlapping.

TABLE 6

| RI | Chosen W1 index for sub-sampling ($i_1$) | Number of W1 hypotheses |
|---|---|---|
| 1 | 0, 2, 4, 6 | 4 |
| 2 | 0, 2, 4, 6 | 4 |
| 3 | 0 (fixed precoding) | 1 |
| 4 | 0 (fixed precoding) | 1 |
| Total number of hypotheses across ranks: | | 8 → 3 bits for UE capable of 2-layers 10 → 4 bits for UE capable of 4-layers |

Alternatively the sub-sampled codebook C1 may replace codeword $i_1=0, 2, 4, 6$ with $i_1=1, 3, 5, 7$, for either/both Rank-1 and rank-2.

Sub-Sampling for Enhanced Codebook 3.

For enhanced codebook 3, the following sub-sampling scheme is proposed.

Table 7 illustrates sub-sampling of codebook C1, for enhanced codebook 3.

TABLE 7

| RI | Chosen W1 index for sub-sampling ($i_1$) | Number of W1 hypotheses |
|---|---|---|
| 1 | 0, 1, 2, 3, 4 | 5 |
| 2 | 0, 1, 2, 3, 4 | 5 |
| 3 | 0, 1, | 2 |
| 4 | 0, 1 | 2 |
| Total number of hypotheses across ranks: | | 10 → 4 bits for UE capable of 2-layers 14 → 4 bits for UE capable of 4-layers |

If W1 overlapping is introduced for the GoB components, the following sub-sampling schemes are proposed.

Table 8 illustrates sub-sampling of codebook C1 for enhanced codebook 3 above with W1 overlapping.

TABLE 8

| RI | Chosen W1 index for sub-sampling ($i_1$) | Number of W1 hypotheses |
|---|---|---|
| 1 | 0, 1, 3, 5, 7 | 5 |
| 2 | 0, 1, 3, 5, 7 | 5 |
| 3 | 0, 1, | 2 |
| 4 | 0, 1 | 2 |
| Total number of hypotheses across ranks: | | 10 → 4 bits for UE capable of 2-layers 14 → 4 bits for UE capable of 4-layers |

Alternatively the sub-sampled C1 codebook may replace codeword $i_1=1, 3, 5, 7$ with $i_1=2, 4, 6, 8$, for either/both Rank-1 and rank-2.

Sub-Sampling for Enhanced Codebook 4.

For enhanced codebook 4, the following sub-sampling scheme is proposed.

Table 9 illustrates sub-sampling of codebook C1 for enhanced codebook 4.

TABLE 9

| RI | Chosen W1 index for sub-sampling ($i_1$) | Number of W1 hypotheses |
|---|---|---|
| 1 | 0, 1, 2, 3 | 4 |
| 2 | 0, 1, 2, 3 | 4 |
| 3 | 0, 1, | 2 |
| 4 | 0, 1 | 2 |
| Total number of hypotheses across ranks: | | 8 → 3 bits for UE capable of 2-layers 12 → 4 bits for UE capable of 4-layers |

If W1 overlapping is introduced for the GoB components, the following subsampling are proposed.

Table 10 illustrates sub-sampling of codebook C1 for enhanced codebook 4 with W1 overlapping.

TABLE 10

| RI | Chosen W1 index for sub-sampling ($i_1$) | Number of W1 hypotheses |
|---|---|---|
| 1 | 0, 2, 4, 6 | 4 |
| 2 | 0, 2, 4, 6 | 4 |
| 3 | 0, 1, | 2 |
| 4 | 0, 1 | 2 |
| Total number of hypotheses across ranks: | | 8 → 3 bits for UE capable of 2-layers 12 → 4 bits for UE capable of 4-layers |

Alternatively the sub-sampled C1 codebook may replace codeword $i_1$=0, 2, 4, 6 with $i_1$=1, 3, 5, 7, for either/both Rank-1 and rank-2.

For any of the above exemplary designs in Tables 2-10, it is possible to combine a part of one example with other part(s) from other examples in Tables 2-10.

Codebook Sub-Sampling Submode 2 (CQI, W1+W2).

In this case, the total payload of CQI together with W1+W2 should not exceed 11 bits to ensure the same worst-case coverage as the LTE Release 8 PUCCH format 2/2a/2b. Hence, the following actions are performed to attain such goal when sub-sampling is performed on the codebook C1+C2 for W1+W2:

To maintain the maximum PUCCH overhead of 11 bits:
  RI=1: Since CQI occupies 4 bits, the payload for W1+W2 should not exceed 7 bits, and
  RI>1: Since CQI occupies 7 bits, the payload for W1+W2 should not exceed 4 bits;
Joint encoding of W1 and W2 should be performed whenever possible. This ensures efficient signaling of W1+W2 with minimum overhead;
Overlapping beams between two different W1 matrices can be skipped whenever appropriate as overlapping beam can be seen as an optimization feature;
Since precoding gain is expected to be small for higher-rank transmission (rank>4), fixed precoding (using only one W1 matrix) should also be considered whenever appropriate; and
Sub-sampling of C1 and C2 can also be performed jointly rather than separately.

Keeping the above principles in mind, three exemplary W1+W2 codebook sub-sampling schemes are given below. Indices of W1 and W2 are given by $i_1$ and $i_2$ respectively.

Sub-Sampling for Enhanced Codebook 1.

Using the 4Tx codebook proposed as enhanced codebook 1, without W1 overlapping, the following sub-sampling scheme is proposed.

Table 11 illustrates sub-sampling of codebook C1+C2, for enhanced codebook 1 without W1 overlapping.

TABLE 11

| RI | Chosen W1 + W2 index for sub-sampling | Number of W1 + W2 hypotheses |
|---|---|---|
| 1 | Alternative 1: W1: 0, 1, 2, 3, 4, ($i_1$) W2: If W1 = identity matrix ($i_1$ = 0), no sub-sampling. (Note this corresponds to LTE Release 8 codebook.) Otherwise, for each W1 ($i_1$ = 1, 2, 3, 4), choose Y = $e_1$, $e_2$, $e_3$, $e_4$ with all 4 possible co-phasing. (Note: this resembles (N, Nb) = (16, 1) design.) | 16 + 4 * 16 = 80 → 7 bits |
| | Alternative 2: W1: 1, 2, 3, 4, ($i_1$), corresponding to the enhancement precoding matrices. (Note: this implies that LTE Release 8 codebook is not used for PUCCH submode 1. This applies if the enhancement components of the LTE Release 12 codebook comprise of all 16 rank-1 LTE Release 8 precoding vectors.) W2: For each W1 ($i_1$ = 1, 2, 3, 4), choose Y = $e_1$, $e_2$, $e_3$, $e_4$ with all 4 possible co-phasing. (Note this resembles (N, Nb) = (16, 1) design.) | 4 * 16 = 64 → 6 bits |
| 2 | Alternative 1: W1: 0 (fixed precoding) (Note this corresponds to LTE Release 8 codebook.) | 4 bits |
| | Alternative 2: W1: $i_1$ = 1, 2, 3, 4. corresponding to the enhancement precoding matrices. W2: For each W1, choose only ($Y_1$, $Y_2$) = ($e_1$, $e_1$), ($e_3$, $e_3$) with all 2 possible co-phasing. | 4 bits |
| 3 | W1: 0 ($i_1$ = 0) W2: No sub-sampling. | 4 bits |
| 4 | W1: 0 ($i_1$ = 0) W2: No sub-sampling. | 4 bits |

If overlapping between adjacent W1 matrices is introduced to the design of enhanced codebook 1, the following sub-sampling is proposed.

Table 12 illustrates sub-sampling of codebook C1+C2 for enhanced codebook 1 with W1 overlapping.

TABLE 12

| RI | Chosen W1 + W2 index for sub-sampling | Number of W1 + W2 hypotheses |
|---|---|---|
| 1 | W1: 0, 1, 3, 5, 7, ($i_1$) W2: If W1 = identity matrix ($i_1$ = 0), no sub-sampling. (Note this corresponds to LTE Release 8 codebook.) Otherwise, for each W1 ($i_1$ = 1, 3, 5, 7), choose Y = $e_1$, $e_2$, $e_3$, $e_4$ with all 4 possible co-phasing. (Note this resembles (N, Nb) = (16, 1) design.) | 16 + 4 * 16 = 80 → 7 bits |
| 2 | Alternative 1: W1: i1 = 0 (fixed precoding) (Note this corresponds to LTE Release 8 codebook.) | 4 bits |
| | Alternative 2: W1: $i_1$ = 1, 3, 5, 7. corresponding to the enhancement precoding matrices. W2: For each W1, choose only ($Y_1$, $Y_2$) = ($e_1$, $e_1$), ($e_3$, $e_3$) with all 2 possible co-phasing. | 4 bits |

TABLE 12-continued

| RI | Chosen W1 + W2 index for sub-sampling | Number of W1 + W2 hypotheses |
|---|---|---|
| 3 | W1: 0<br>W2: No sub-sampling | 4 bits |
| 4 | W1: 0<br>W2: No sub-sampling | 4 bits |

Sub-Sampling for Enhanced Codebook 2.

Using the 4Tx codebook proposed as enhanced codebook 2, without W1 overlapping, the following sub-sampling scheme is proposed.

Table 13 illustrates sub-sampling of codebook C1+C2, for enhanced codebook 2 without W1 overlapping.

TABLE 13

| RI | Chosen W1 + W2 index for sub-sampling | Number of W1 + W2 hypotheses |
|---|---|---|
| 1 | W1: 0, 1, 2, 3 ($i_1$)<br>W2: For each W1 ($i_1$ = 0, 1, 2, 3), choose $Y = e_1, e_2, e_3, e_4$ with all 4 possible co-phasing. (Note this resembles (N, Nb) = (16, 1) design.) | 4 * 16 = 64 → 6 bits |
| 2 | W1: $i_1$ = 0, 1, 2, 3.<br>W2: For each W1, choose only $(Y_1, Y_2) = (e_1, e_1), (e_3, e_3)$ with all 2 possible co-phasing. | 4 bits |
| 3 | W1: 0<br>W2: No sub-sampling | 4 bits |
| 4 | W1: 0<br>W2: No sub-sampling | 4 bits |

If overlapping between adjacent W1 matrices is introduced to the design of enhanced codebook 2, the following sub-sampling is proposed.

Table 14 illustrates sub-sampling of codebook C1+C2, for enhanced codebook 2, with W1 overlapping.

TABLE 14

| RI | Chosen W1 + W2 index for sub-sampling | Number of W1 + W2 hypotheses |
|---|---|---|
| 1 | W1: 0, 2, 4, 6 ($i_1$)<br>W2: For each W1 ($i_1$ = 0, 1, 2, 3), choose $Y = e_1, e_2, e_3, e_4$ with all 4 possible co-phasing. (Note this resembles (N, Nb) = (16, 1) design.) | 4 * 16 = 64 → 6 bits |
| 2 | W1: $i_1$ = 0, 2, 4, 6.<br>W2: For each W1, choose only $(Y_1, Y_2) = (e_1, e_1), (e_3, e_3)$ with all 2 possible co-phasing. | 4 bits |
| 3 | W1: 0<br>W2: No sub-sampling | 4 bits |
| 4 | W1: 0<br>W2: No sub-sampling | 4 bits |

Sub-Sampling for Enhanced Codebook 3.

Using the 4Tx codebook proposed for enhanced codebook 3, without W1 overlapping, the following sub-sampling scheme is proposed.

Table 15 illustrates sub-sampling of codebook C1+C2, for enhanced codebook 3, without W1 overlapping.

TABLE 15

| RI | Chosen W1 + W2 index for sub-sampling | Number of W1 + W2 hypotheses |
|---|---|---|
| 1 | Alternative 1:<br>W1: 0, 1, 2, 3, 4, ($i_1$)<br>W2: If W1 = identity matrix ($i_1$ = 0), no sub-sampling. (Note this corresponds to LTE Release 8 codebook)<br>Otherwise, for each W1 ($i_1$ = 1, 2, 3, 4), choose $Y = e_1, e_2, e_3, e_4$ with all 4 possible co-phasing. (Note this resembles (N, Nb) = (16, 1) design.) | 16 + 4 * 16 = 80 → 7 bits |
|  | Alternative 2:<br>W1: 1, 2, 3, 4, ($i_1$), corresponding to the enhancement precoding matrices<br>W2: For each W1 ($i_1$ = 1, 2, 3, 4), choose $Y = e_1, e_2, e_3, e_4$ with all 4 possible co-phasing. (Note this resembles (N, Nb) = (16, 1) design.) | 4 * 16 = 64 → 6 bits |
| 2 | Alternative 1:<br>W1, $i_1$ = 0 (fixed precoding) (Note this correspond to LTE Release 8 codebook.) | 4 bits |
|  | Alternative 2:<br>W1: $i_1$ = 1, 2, 3, 4.<br>W2: For each W1, choose only $(Y_1, Y_2) = (e_1, e_1), (e_3, e_3)$ with all 2 possible co-phasing. | 4 bits |
| 3 | Alternative 1: W1: $i_1$ = 0. W2: No sub-sampling. | 4 bits |
|  | Alternative 2: W1: $i_1$ = 1. W2: No sub-sampling. | 3 bits |

TABLE 15-continued

| RI | Chosen W1 + W2 index for sub-sampling | Number of W1 + W2 hypotheses |
|---|---|---|
| 4 | Alternative 1: W1: $i_1$ = 0. W2: No sub-sampling. | 4 bits |
|   | Alternative 2: W1: $i_1$ = 1. W2: No sub-sampling. | 3 bits |

If overlapping between adjacent W1 matrices are introduced to the design of enhanced codebook 3, the following subsampling is proposed.

Table 16 illustrates sub-sampling of codebook C1+C2, for enhanced codebook 3, with W1 overlapping.

TABLE 16

| RI | Chosen W1 + W2 index for sub-sampling | Number of W1 + W2 hypotheses |
|---|---|---|
| 1 | W1: 0, 1, 3, 5, 7, ($i1$)<br>W2: If W1 = identity matrix ($i_i$ = 0), no sub-sampling.<br>Otherwise, for each W1 ($i_1$ = 1, 3, 5, 7), choose Y = $e_1$, $e_2$, $e_3$, $e_4$ with all 4 possible co-phasing. (Note this resembles (N, Nb) = (16, 1) design.) | 16 + 4 * 16 = 80 → 7 bits |
| 2 | Alternative 1:<br>W1: 0 (fixed precoding). | 4 bits |
|   | Alternative 2:<br>W1: $i_1$ = 1, 3, 5, 7, corresponding to the enhancement precoding matrices.<br>W2: For each W1, choose only $(Y_1, Y_2)$ = $(e_1, e_1)$, $(e_3, e_3)$ with all 2 possible co-phasing. | 4 bits |
| 3 | Alternative 1: W1: $i_1$ = 0. W2: No sub-sampling. | 4 bits |
|   | Alternative 2: W1: $i_1$ = 1. W2: No sub-sampling. | 3 bits |
| 4 | Alternative 1: W1: $i_1$ = 0. W2: No sub-sampling. | 4 bits |
|   | Alternative 2: W1: $i_1$ = 1. W2: No sub-sampling. | 3 bits |

Sub-Sampling for Enhanced Codebook 4.

Using the 4Tx codebook proposed as enhanced codebook 4, without W1 overlapping, the following sub-sampling scheme is proposed.

Table 17 illustrates a sub-sampling of codebook C1+C2, for enhanced codebook 4, without W1 overlapping.

TABLE 17

| RI | Chosen W1 + W2 index for sub-sampling | Number of W1 + W2 hypotheses |
|---|---|---|
| 1 | W1: 0, 1, 2, 3 ($i_1$)<br>W2: For each W1 ($i_1$ = 0, 1, 2, 3), choose Y = $e_1$, $e_2$, $e_3$, $e_4$ with all 4 possible co-phasing. (Note this resembles (N, Nb) = (16, 1) design.) | 4 * 16 = 64 → 6 bits |
| 2 | W1: $i_1$ = 0, 1, 2, 3.<br>W2: For each W1, choose only $(Y_1, Y_2)$ = $(e_1, e_1)$, $(e_3, e_3)$ with all 2 possible co-phasing. | 4 bits |
| 3 | Alternative 1: W1: $i_1$ = 0. W2: No sub-sampling. | 4 bits |
|   | Alternative 2: W1: $i_1$ = 1. W2: No sub-sampling. | 3 bits |
| 4 | Alternative 1: W1: $i_1$ = 0. W2: No sub-sampling. | 4 bits |
|   | Alternative 2: W1: $i_1$ = 1. W2: No sub-sampling. | 3 bits |

If overlapping between adjacent W1 matrices is introduced to the design of enhanced codebook 4, the following subsampling is proposed.

Table 18 illustrates sub-sampling of codebook C1+C2, for enhanced codebook 4, with W1 overlapping.

TABLE 18

| RI | Chosen W1 + W2 index for sub-sampling | Number of W1 + W2 hypotheses |
|---|---|---|
| 1 | W1: 0, 2, 4, 6 ($i_1$)<br>W2: For each W1 ($i_1$ = 0, 1, 2, 3), choose Y = $e_1$, $e_2$, $e_3$, $e_4$ with all 4 possible co-phasing. (Note this resembles (N, Nb) = (16, 1) design.) | 4 * 16 = 64 → 6 bits |
| 2 | W1: $i_1$ = 0, 2, 4, 6.<br>W2: For each W1, choose only $(Y_1, Y_2)$ = $(e_1, e_1)$, $(e_3, e_3)$ with all 2 possible co-phasing. | 4 bits |
| 3 | Alternative 1: W1: $i_1$ = 0. W2: No sub-sampling. | 4 bits |
|   | Alternative 2: W1: $i_1$ = 1. W2: No sub-sampling. | 3 bits |
| 4 | Alternative 1: W1: $i_1$ = 0. W2: No sub-sampling. | 4 bits |
|   | Alternative 2: W1: $i_1$ = 1. W2: No sub-sampling. | 3 bits |

For any of the above exemplary designs in Tables 11-18, it is possible to combine a part of one example with other part(s) from other examples in other Tables 11-18.

Using 8Tx Sub-Sampling for 4Tx Feedback on PUCCH.

As discussed in the disclosure of U.S. application Ser. No. 14/177,547, the enhancement component of the proposed 4Tx codebook is designed with GoB principles. Note that the same GoB principle has been used in the design of LTE Release 10 8Tx codebook, where N=32 and Nb=4. It is noted that the GoB design principle is universally applicable to many TX-dimension (e.g., $N_t$=4, 8, 16, . . . ). As such, a 4Tx codebook designed with GoB can be derived by down-scaling the 8Tx GoB codebook, wherein downscaling refers to selecting four rows out of the eight rows of an 8Tx precoding matrix. Several possibilities of codebook downscaling have been discussed in U.S. application Ser. No. 14/177,547. For instance, the 4Tx codebook can be derived by downscaling all precoding matrices of the 8Tx codebook, or that the 4Tx codebook comprises of down-sized precoding matrices from a subset of the 8Tx codebook. In these two cases, 4Tx sub-sampling on PUCCH may be based on the sub-sampling of 8Tx feedback in LTE Release 10.

In one embodiment, the 4Tx codebook (i.e., the enhancement component corresponding to GoB double-codebook structure) is derived by downscaling all precoding matrices of the 8Tx codebook. This implies that the 4Tx codebook of the enhancement component is design with (N, Nb)=(32,4) and has the same codebook size as the 8Tx codebook, for both W1 codebook C1, W2 codebook C2, as well as the composite codebook C. It's therefore possible to design 4Tx PUCCH sub-sampling based on 8Tx PUCCH sub-sampling.

Rank-1/2

In one embodiment, the enhanced LTE Release 12 4Tx codebook is completely redesigned and comprises the down-scaled 8Tx precoding matrices. The enhanced LTE Release 12 codebook does not comprise any LTE Release 8 codebook vectors. In such a case, 4Tx PUCCH sub-sampling may reuse the same PUCCH feedback mechanism of 8Tx.

For a UE Capable of 2-Layer Operation:

For PUCCH submode 1, the sub-sampling illustrated in Tables 19 and 20 can be used.

TABLE 19

| RI | Chosen W1 index for sub-sampling ($i_1$) | Number of W1 hypotheses |
|---|---|---|
| 1 | Every other W1 matrix of the GoB codebook, e.g. 0, 2, 4, 6, 8, 10, 12, 14 | 8 |
| 2 | Every other W2 matrix of the GoB codebook, e.g. 0, 2, 4, 6, 8, 10, 12, 14 | 8 |
| | Total number of hypotheses across ranks. | 16 → 4 bits for UE capable of 2-layers |

TABLE 20

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |

For PUCCH submode 2, the sub-sampling illustrated in Tables 21 and 22 can be used.

TABLE 21

| RI | Chosen W1 + W2 index for sub-sampling | Number of W1 + W2 hypotheses |
|---|---|---|
| 1 | W1: 0, 2, 4, 6, 8, 10, 12, 14 ($i_1$) W2: For each W1 ($i_1$ = 0, 1, 2, 3), choose Y = e1, e2, e3, e4 with all 4 possible co-phasing [note: this resembles (N, Nb) = (32, 1) design] | 8 * 16 = 64 → 7 bits |
| 2 | W1: $i_1$ = 0, 2, 4, 6, 8, 12, 14 W2: For each W1, choose only (Y1, Y2) = (e1, e1) with all 2 possible co-phasing | 4 bits |

TABLE 22

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | Total bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |

For PUCCH mode 2-1, the same sub-sampling table and PUCCH format for 8Tx can be used for 4Tx.

Rank-3/4

For a UE capable of 4-layer operation, PUCCH sub-sampling depends on the codebook design for rank-3/4.

If rank-3/4 of the enhanced 4Tx codebook reuses the LTE Release 8 codebook, PUCCH sub-sampling shall consider the fact that only one wideband W1 is available for rank-3 and Rank-4 (e.g., 4×4 identity matrix). Therefore, the PUCCH sub-sampling Tables 23 and 24 should be used.

TABLE 23

| RI | Chosen W1 index for sub-sampling ($i_1$) | Number of W1 hypotheses |
|---|---|---|
| 1 | Every other W1 matrix of the GoB codebook, e.g. $i_1$ = 0, 2, 4, 6, 8, 10, 12, 14 | 8 |
| 2 | Every other W2 matrix of the GoB codebook, e.g. $i_1$ = 0, 2, 4, 6, 8, 10, 12, 14 | 8 |
| 3 | LTE Release 8 codebook, i.e., $i_1$ = 0 | 1 |
| 4 | LTE Release 8 codebook, i.e. , $i_1$ = 0 | 1 |
| | Total number of hypotheses across ranks: | 16 → 4 bits for UE capable of 2-layers 18 → 5 bits for UE capable of 4-layers |

TABLE 24

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16 | 3 | $2(I_{RI/PMI1}-16)$ |
| 17 | 4 | $2(I_{RI/PMI1}-17)$ |
| 17-31 | reserved | NA |

Similarly for PUCCH submode 2 where W1 is jointly encoded with W2/CQI, for a UE capable of 4-layer transmission, PUCCH sub-sampling shall consider the fact only one wideband W1 is available for Rank-3 and Rank-4 (e.g. an identity matrix). Tables 25 and 26 are an example of such sub-sampling.

TABLE 25

| RI | Chosen W1 + W2 index for sub-sampling | Number of W1 + W2 hypotheses |
|---|---|---|
| 1 | W1: 0, 2, 4, 6, 8, 10, 12, 14 ($i_1$) W2: For each W1 ($i_1$ = 0, 1, 2, 3), choose Y = $e_1, e_2, e_3, e_4$ with all 4 possible co-phasing. (Note this resembles (N, Nb) = (32, 1) design.) | 8 * 16 = 64 → 7 bits |
| 2 | W1: $i_1$ = 0, 2, 4, 6, 8, 12, 14 W2: For each W1, choose only ($Y_1, Y_2$) = ($e_1, e_1$) with all 2 possible co-phasing. | 4 bits |
| 3 | W1: $i_1$ = 0 (e.g., the LTE Release 8 codebook is chosen, W1 = $I_4$). W2: no sub-sampling. | 4 bits |
| 3 | W1: $i_1$ = 0 (e.g., the LTE Release 8 codebook is chosen, W1 = $I_4$). W2: no sub-sampling. | 4 bits |

TABLE 26

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | Total bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0 | 0 | 0-15 | $I_{PMI2}$ | 4 |
| 4 | 0 | 0 | 0-15 | $I_{PMI2}$ | 4 |

Sub-Sampling for Other Codebooks.

A hybrid codebook is proposed in pending U.S. patent application Ser. No. 14/177,547.

Sub-sampling for this codebook should following a few high-level principles.

The sub-sampled codebook should comprise W1 matrices with both adjacent beams and distributed beams. W1 with adjacent beams are advantageous in channels with narrow angular spread, and/or with perfecting antenna calibration. On the other hand, W1 with distributed beams are more suitable for channel with large antenna spacing, with wide angular spread, or with timing misalignment error at the eNB.

For W1 matrices with adjacent beams, different W1 matrices with overlapping beams are not necessary because the edge effect is not significant for wideband PMI feedback on PUCCH. Therefore, sub-sampled W1 should include W1 without overlapping.

For W1 matrices with distributed beams, note that there are a total of 8 W1 matrices, each offset by one DFT beam of an over-sampling rate N=32. Sub-sampled codebook may use every second W1 matrix, or every fourth W1 matrix, depending on the overhead payload after sub-sampling.

For PUCCH mode 1-1, submode 1, the sub-sampling possibilities illustrated in Tables 27 and 28 are proposed.

TABLE 27

| RI | Chosen W1 index for sub-sampling ($i_1$) | Number of W1 hypotheses |
|---|---|---|
| 1 | Every other W1 matrix of the GoB codebook, e.g. $i_1$ = 0, 2, 4, 6, 8, 10, 12, 14 | 8 |
| 2 | Every other W2 matrix of the GoB codebook, e.g. $i_1$ = 0, 2, 4, 6, 8, 10, 12, 14 | 8 |

TABLE 27-continued

| RI | Chosen W1 index for sub-sampling ($i_1$) | Number of W1 hypotheses |
|---|---|---|
| 3 | Use LTE Release 8 codebook, i.e., $i_1$ = 0 | 1 |
| 4 | Use LTE Release 8 codebook, i.e., $i_1$ = 0 | 1 |
| | Total number of hypotheses across ranks: | 16 → 4 bits for UE capable of 2-layers 18 → 5 bits for UE capable of 4-layers |

TABLE 28

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16 | 3 | $2(I_{RI/PMI1}-16)$ |
| 17 | 4 | $2(I_{RI/PMI1}-17)$ |
| 17-31 | reserved | NA |

For PUCCH mode 1-1, submode 2, the sub-sampling possibilities in Table 29 are proposed.

TABLE 29

| RI | Chosen W1 + W2 index for sub-sampling | Number of W1 + W2 hypotheses |
|---|---|---|
| 1 | W1: 0, 2, 4, 6, 8, 10, 12, 14 ($i_1$) W2: For each sub-sampled W1, choose Y = $e_1, e_2, e_3, e_4$ with all 4 possible co-phasing. | 8 * 16 = 64 → 7 bits |
| 2 | W1: $i_1$ = 0, 2, 4, 6, 8, 12, 14 W2: For W1 of adjacent beams, choose only ($Y_1, Y_2$) = ($e_1, e_1$) with all 2 possible co-phasing W2: For W1 of distributed beams: Embodiment 1: choose $\frac{1}{\sqrt{2}}\begin{bmatrix} Y_1 & Y_2 \\ Y_1 & Y_2 \end{bmatrix}$, or arbitrary matrix in C2, and ($Y_1, Y_2$) = {($\tilde{e}_1, \tilde{e}_3$), ($\tilde{e}_2, \tilde{e}_4$)}. Embodiment 2: choose W2 = $\begin{bmatrix} Y_1 & Y_2 \\ Y_1 & Y_2 \end{bmatrix}$ and $\begin{bmatrix} Y_1 & Y_2 \\ Y_1 & -Y_2 \end{bmatrix}$, and ($Y_1, Y_2$) = ($\tilde{e}_1, \tilde{e}_3$), or ($\tilde{e}_2, \tilde{e}_4$). Embodiment 3: choose W2 = $\begin{bmatrix} Y_1 & Y_2 \\ Y_1 & Y_2 \end{bmatrix}$, and $\begin{bmatrix} Y_1 & Y_2 \\ jY_1 & jY_2 \end{bmatrix}$, and ($Y_1, Y_2$) = ($\tilde{e}_1, \tilde{e}_3$), or ($\tilde{e}_2, \tilde{e}_4$). | 4 bits |
| 3 | W1: $i_1$ = (e.g., the LTE Release 8 codebook is chosen, W1 = $I_4$) W2: no sub-sampling. | 4 bits |
| 4 | W1: $i_1$ = 0 (e.g., the LTE Release 8 codebook is chosen, W1 = $I_4$) W2: no sub-sampling. | 4 bits |

PUCCH Mode 2-1 for 4Tx

If PUCCH mode 2-1 is to be supported for the new 4tx codebook, the PUCCH reporting structure and sub-sampling needs to be studied taking into account the codebook design of rank-1/2 and rank-3/4.

First we review the reporting structure of PUCCH mode 2-1:

W is determined from a 3-subframe report conditioned upon the latest RI report.

Reporting format:
- Report 1 (Type 6): RI and 1-bit precoder type indication (PTI)
- Report 2:
  - PTI=0: W1 will be reported (Type 2a)
  - PTI=1: wideband CQI and wideband W2 will be reported (Type 2b)
- Report 3:
  - PTI=0: wideband CQI and wideband W2 will be reported (Type 2b)
  - PTI=1: subband CQI, subband W2 (Type 1a), plus an L-bit (e.g., L=2) indicator signaling a selected subset of subbands for which the reported subband CQI/W2 shall apply.

Given the maximum 11-bit payload of the PUCCH channel, the total number of CSI bits on each PUCCH transmission shall satisfy the following constraint:

Type 6: 3-bit joint encoding of RI and PTI, no sub-sampling is needed.

Type 2a: wideband W1 (4-bit for rank-1/2, 0-bit if the LTE Release 8 codebook is used for rank-3/4), no sub-sampling is needed.

Type 2b: wideband W1 (4-bit for rank-1/2, 0-bit if the LTE Release 8 codebook is used for rank-3/4) and CQI (4-bit for Rank-1 and 7-bit for rank>1), no sub-sampling is needed.

Type 1a: subband W2+subband CQI (4-bit for Rank-1 and 7-bit for rank>1)+L (e.g., L=2) bits subband indicator.
Rank1: subband W2 payload is 4 bits.
Rank>1: subband W2 payload is 2 bits.

As can be seen, sub-sampling is only required for PUCCH type 1a. This is discussed in the following.

Rank-1/2

For rank-1/2, if the same GoB framework and parameters of 8Tx are used to design the 4Tx codebook, the W1/W2 codebook size of 4Tx will be exactly the same as of 8Tx. In brief, the W1 wideband precoder is 4 bits, while W2 precoder is also 4 bits. As such, the sub-sampling details of PUCCH mode 2-1 for 8Tx can be reused without any change for 4Tx.

Table 30 illustrates PUCCH mode 2-1, type 1a sub-sampling for rank-1/2.

TABLE 30

Relationship between the second PMI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |

Rank-3/4

For rank-3/4, the LTE Release 8 codebook is preferably reused because GoB codebook does not bring significant performance improvement, or even causes performance degradation in some scenarios. The W1 codebook has 0-bit (e.g., a single element of a 4×4 identity matrix), and the W2 codebook reuses the LTE Release 8 codebook which is 4 bits. As a result, sub-sampling for 4Tx PUCCH mode 2-1 needs to be redesigned for rank-3/4, to reduce W2 to 2-bit.

To solve this issue we take a closer look at the LTE Release 8 codebook structure. The LTE Release 8 codebook satisfies the nested property where the l-th precoder (l=0, . . . 15) of rank r (r=1, 2, 3, 4) comprises l columns of the Householder transformation of the l-th 4×1 base vector. Furthermore, the Rank-1 LTE Release 8 codebook consists of sixteen vectors (e.g., 4 bits), where the first eight vectors are DFT vectors which are preferably used for uniform linear array (ULA) antennas at the eNB, and the last eight vectors are optimized for cross-polarized (XPD) antenna configuration at the eNB. The phase of each 4Tx Rel-8 Rank-1 codebook is tabularized below.

Table 31 is an analysis of the phase of the Rank-1 LTE Release 8 codebook.

TABLE 31

| Precoder index | 0 | 1 | 2 | 3 | 4 | 5 | 6 | 7 |
|---|---|---|---|---|---|---|---|---|
| Antenna-1 | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ |
| Antenna2 | $0 \times \frac{\pi}{2}$ | $1 \times \frac{\pi}{2}$ | $2 \times \frac{\pi}{2}$ | $3 \times \frac{\pi}{2}$ | $0.5 \times \frac{\pi}{2}$ | $1.5 \times \frac{\pi}{2}$ | $2.5 \times \frac{\pi}{2}$ | $3.5 \times \frac{\pi}{2}$ |
| Antenna 3 | $0 \times \frac{\pi}{2}$ | $2 \times \frac{\pi}{2}$ | $4 \times \frac{\pi}{2}$ | $6 \times \frac{\pi}{2}$ | $1 \times \frac{\pi}{2}$ | $3 \times \frac{\pi}{2}$ | $5 \times \frac{\pi}{2}$ | $7 \times \frac{\pi}{2}$ |
| Antenna 4 | $0 \times \frac{\pi}{2}$ | $3 \times \frac{\pi}{2}$ | $6 \times \frac{\pi}{2}$ | $9 \times \frac{\pi}{2}$ | $1.5 \times \frac{\pi}{2}$ | $4.5 \times \frac{\pi}{2}$ | $7.5 \times \frac{\pi}{2}$ | $105 \times \frac{\pi}{2}$ |

| Precoder index | 8 | 9 | 10 | 11 | 12 | 13 | 14 | 15 |
|---|---|---|---|---|---|---|---|---|
| Antenna-1 | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ | $0 \times \frac{\pi}{2}$ |
| Antenna2 | $0 \times \frac{\pi}{2}$ | $1 \times \frac{\pi}{2}$ | $3 \times \frac{\pi}{2}$ | $3 \times \frac{\pi}{2}$ | $0 \times \frac{\pi}{2}$ | $0 \times \frac{\pi}{2}$ | $2 \times \frac{\pi}{2}$ | $2 \times \frac{\pi}{2}$ |

TABLE 31-continued

| Antenna 3 | $2\times\frac{\pi}{2}$ | $0\times\frac{\pi}{2}$ | $2\times\frac{\pi}{2}$ | $0\times\frac{\pi}{2}$ | $0\times\frac{\pi}{2}$ | $2\times\frac{\pi}{2}$ | $0\times\frac{\pi}{2}$ | $2\times\frac{\pi}{2}$ |
|---|---|---|---|---|---|---|---|---|
| Antenna 4 | $2\times\frac{\pi}{2}$ | $1\times\frac{\pi}{2}$ | $0\times\frac{\pi}{2}$ | $3\times\frac{\pi}{2}$ | $2\times\frac{\pi}{2}$ | $0\times\frac{\pi}{2}$ | $0\times\frac{\pi}{2}$ | $2\times\frac{\pi}{2}$ |

It can be seen that the first 8 Rank-1 precoders correspond to DFT vectors of beam directions $$\{0, 1, 2, 3, 0.5, 1.5, 2.5, 3.5\}\times\frac{\pi}{2}.$$

These DFT vectors are evenly distributed to provide a uniform coverage of the [0, 2π] degree angle-of-arrival/departure subspace, and are particularly suitable to be used for ULA antenna arrays. The next 8 Rank-1 precoders are not DFT vectors and cannot be represented by a specific angle-of-arrival/departure; however, they can be interpreted as the spatial signature for a cross-polarized antenna array, where the $1^{st}$ cross-polarization angle (e.g. antenna 1 and antenna 2) and the $2^{nd}$ cross-polarization angle (e.g. antenna 3 and 4) are represented by two separate 2Tx DFT vectors, respectively. Since the rank-3/4 codebooks sub-matrices of Housholder transformation of each corresponding Rank-1 base vector, it is proposed that sub-sampling of the rank-3/4 codebook is based on the co-phasing structure of the corresponding Rank-1 codebook. The sub-sampling illustrated in Table 32 is proposed for PUCCH type 1a in 4Tx rank-3/4.

Embodiment 1:

In one embodiment, for Rank-3 and Rank-4, the 2-bit sub-sampled W2 codebook takes every fourth entry in the LTE Release 8 codebook, e.g. W2: $i_2=\{0, 4\ 8, 12\}+k$. Here k is an offset number. An example is given in Table 31 where k=0 is assumed.

TABLE 32

| RI | W2 sub-sampling | Number of W2 hypothesis |
|---|---|---|
| 3 | W1: $i_1 = 0$ (e.g., the LTE Release 8 codebook is chosen, W1 = $I_4$). W2: $i_2 = 0, 4\ 8, 12$ | 2 bits |
| 4 | W1: $i_1 = 0$ (e.g. LTE Release 8 codebook is chosen, W1 = $I_4$). W2: $i_2 = 0, 4\ 8, 12$ | 2 bits |

Embodiment 2:

In another embodiment, for Rank-3 and Rank-4, the 2-bit sub-sampled W2 codebook takes the first four entries in the LTE Release 8 codebook, e.g., W2: $i_2=0, 1\ 2, 3$. These are critically sampled DFT vectors that uniformly quantizes the 4Tx DFT precoding subspace, and are expected to work well for base stations equipped with uniform linear array (ULA) antennas. Alternatively, W2: $i_2=4, 5\ 6, 7$ may be considered.

Embodiment 3:

In another embodiment, for Rank-3 and Rank-4, the 2-bit sub-sampled W2 codebook takes precoders 8-11 in the LTE Release 8 codebook, e.g., $i_2=8, 9, 10, 11$. These precoders are expected to work well for cross-polarized (XPOL) antenna configurations.

Embodiment 4:

In yet another embodiment, for Rank-3 and Rank-4, the 2-bit sub-sampled W2 codebook takes two W2 precoders from Embodiment 2 (e.g., i2=0, 2) and two precoders from Embodiment 3 (e.g., $i_2=8, 10$). The first two W2 precoders are DFT vectors suitable for ULA antenna configuration, and the next two W2 precoders are non-DFT vectors suitable for XPD antenna configuration. This achieves a balanced performance between ULA and XPOL antenna configurations, regardless of the actual antenna configuration that an eNB deploys.

Embodiment 5:

In yet another embodiment, for Rank-3 and Rank-4, the 2-bit sub-sampled W2 codebooks are configured semi-statically by RRC-higher-layer signals. If a UE is configured in coordinated multi-point (CoMP) transmission mode and configured with multiple CSI-processes, the RRC configuration of sub-sampled W2 codebook is performed independently per CSI-RS process.

It is possible for eNB to semi-statically RRC configure the sub-sampling schemes of PUCCH type 1a for rank-3/4 (e.g., using Embodiment 1 to 5).

Sub-Sampling with Other Codebook Designs.

Several other rank-1/2 4Tx codebooks are possible. This section lists two possible rank-1/2 4Tx codebooks and discusses their sub-sampling details for PUCCH mode 1-1, submode-1, PUCCH mode 1-1 submode 2, and PUCCH mode 2-1.

Alternative Codebook 1

One possible 4Tx codebook for rank-1/2 is listed below, where W1 has 4 bits, and W2 has 4 bits.

$$W_1 = \begin{bmatrix} X_n & 0 \\ 0 & X_n \end{bmatrix} \quad (35)$$

where $n = 0, 1, \ldots, 15$ $$X_n = \begin{bmatrix} 1 & 1 & 1 & 1 \\ q_1^n & q_1^{n+8} & q_1^{n+16} & q_1^{n+24} \end{bmatrix} \quad (36)$$

where $q_1 = e^{j2\pi/32}$

For rank 1, $$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\}, \quad (37)$$

$Y \in \{e_1, e_2, e_3, e_4\}$, (38)

and $\alpha(i) = q_1^{2(i-1)}$ (39)

where α(i) is a co-phasing vector.

For rank 2, $$W_{2,n} \in \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (40)$$

$$(Y_1, Y_2) = (e_i, e_k) \in \{(e_1, e_1), (e_2, e_2), \\ (e_3, e_3), (e_4, e_4), (e_1, e_2), (e_2, e_3), (e_1, e_4), (e_2, e_4)\} \quad (41)$$

Note that the n-th W1 matrix (n=0, ... 15) comprises four distributed DFT beams that cover a wide angular spread. Furthermore, DFT beams in different W1 matrices are cyclically shifted. It is noted that the first eight W1 matrices (n=0, ... 7) has no overlapping DFT beams, while the last eight W1 matrices (n=8, ... 15) comprise exactly the same set of DFT beams as W1 (n=0, ... 7) which are cyclically shifted. Hence, if sub-sampling is needed for W1, the first eight W1 matrices (n=0, ... 7) or a subset thereof shall be used, while the last eight W1 matrices (n=8, ... 15) can be omitted.

PUCCH Mode 1-1, Submode 1.

In submode 1 where RI/W1 is jointly encoded, sub-sampling is not needed for W2, but needed for jointly encoded RI/W1. The details depend on the maximum number of bits allowed for jointly encoded RI/W1. In one embodiment, the number of bits for RI/W1 is 4 bits for a 2-layer UE and 5 bits for a 4-layer UE, where sub-sampling details are given in Tables 33 and 34.

TABLE 33

| RI | Chosen W1 index for sub-sampling ($i_1$) | Number of W1 hypotheses |
|---|---|---|
| 1 | Eight W1 matrices without overlapping DFT beams, e.g., $i_1 = \{0, 1, \ldots 7\}$. | 8 |
| 2 | Eight W1 matrices without overlapping DFT beams, e.g., $i_1 = \{0, 1, \ldots 7\}$. | 8 |
| 3 | LTE Release 8 codebook, i.e., $i_1 = 0$ | 1 |
| 4 | LTE Release 8 codebook, i.e., $i_1 = 0$ | 1 |
| | Total no. hypotheses across ranks. | 16 → 4 bits for UE capable of 2-layers |
| | | 18 → 5 bits for UE capable of 4-layers |

TABLE 34

| Value of joint encoding of RI and the first PMI $I_{RI/PMI}$ | RI | Codebook index $i_1$ |
|---|---|---|
| 0-7 | 1 | $I_{RI/PMI}$ |
| 8-15 | 2 | $(I_{RI/PMI}-8)$ |
| 16 | 3 | $(I_{RI/PMI}-16)$ |
| 17 | 4 | $(I_{RI/PMI}-17)$ |
| 18-31 | reserved | NA |

In another embodiment, the number of bits for RI/W1 is 5 bits for a 2-layer UE and 6 bits for a 4-layer UE. In this case there is no sub-sampling for RI/W1 or W2/CQI, and the bitfields are given in Tables 35 and 36.

TABLE 35

| RI | Chosen W1 index for sub-sampling ($i_1$) | Number of W1 hypotheses |
|---|---|---|
| 1 | No sub-sampling, e.g., $i_1 = 0$-15 | 16 |
| 2 | No sub-sampling, e.g., $i_1 = 0$-15 | 16 |
| 3 | LTE Release 8 codebook, i.e., $i_1 = 0$ | 1 |
| 4 | LTE Release 8 codebook, i.e., $i_1 = 0$ | 1 |
| | Total no. hypotheses across ranks. | 32 → 5 bits for UE capable of 2-layers |
| | | 34 → 6 bits for UE capable of 4-layers |

TABLE 36

| Value of joint encoding of RI and the first PMI $I_{RI/PMI}$ | RI | Codebook index $i_1$ |
|---|---|---|
| 0-15 | 1 | $I_{RI/PMI}$ |
| 16-31 | 2 | $I_{RI/PMI}-16$ |
| 32 | 3 | $I_{RI/PMI}-32$ |
| 33 | 4 | $I_{RI/PMI}-33$ |
| 34-63 | reserved | NA |

If the maximum payload of RI/W1 is a concern, the number of bits for RI/W1 can be reduced to 3 bits for a 2-layer UE and 4 bits for a 4-layer UE. In this case, every second W1 matrix is sub-sampled for rank-1/2. The sub-sampling details are given in Tables 37 and 38.

TABLE 37

| RI | Chosen W1 index for sub-sampling ($i_1$) | Number of W1 hypotheses |
|---|---|---|
| 1 | Every second of the first eight W1 matrices e.g., $i_1 = \{0, 2, 4, 6\}$. | 4 |
| 2 | Every second of the first eight W1 matrices e.g., $i_1 = \{0, 2, 4, 6\}$. | 4 |
| 3 | LTE Release 8 codebook, i.e., $i_1 = 0$ | 1 |
| 4 | LTE Release 8 codebook, i.e., $i_1 = 0$ | 1 |
| | Total no. hypotheses across ranks. | 8 → 3 bits for UE capable of 2-layers |
| | | 10 → 4 bits for UE capable of 4-layers |

TABLE 38

| Value of joint encoding of RI and the first PMI $I_{RI/PMI1}$ | RI | Codebook index $i_1$ |
|---|---|---|
| 0-3 | 1 | $2I_{RI/PMI}$ |
| 4-7 | 2 | $2(I_{RI/PMI}-4)$ |
| 8 | 3 | $I_{RI/PMI}-8$ |
| 9 | 4 | $I_{RI/PMI}-9$ |
| 10-15 | reserved | NA |

PUCCH Mode 1-1, Submode 2.

For submode 2, W1/W2 and CQI are jointly encoded in a single PUCCH transmission. Therefore, W1/W2 total payload is limited by 7 bits in Rank-1, and 4 bits in Rank-2. The sub-sampling schemes illustrated in Table 39 can be considered for PUCCH mode 1-1, submode 2.

TABLE 39

| RI | Chosen W1 + W2 index for sub-sampling | Number of W1 + W2 hypotheses |
|---|---|---|
| 1 | For W1, sub-sampling can be 0, 1, ... 7 ($i_1$)<br>For W2: either no sub-sampling (e.g., 4-bit W2), or W2 is sub-sampled to 3-bits as<br>$$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\}$$<br>and $Y = e_i \in \{e_1, e_3\}$ or $Y \in \{e_2, e_4\}$ and $\alpha(i) = q_1^{2(i-1)}$; | Max 7 bits |
| 2 | Embodiment 1:<br>For W1, sub-sampling can be 0, , 1, ... 7 ($i_1$)<br>For W2, sub-sampling can be<br>$$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$$<br>and $(Y_1, Y_2) = (e_i, e_k) \in \{(e_1, e_1)\}$<br>Embodiment 2:<br>For W1, sub-sampling can be 0, 2, 4, 6 ($i_1$)<br>$$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$$<br>and $(Y_1, Y_2) = (e_i, e_k) \in \{(e_1, e_1), (e_3, e_3)\}$<br>Embodiment 3:<br>For W1, sub-sampling can be 0, 4, ($i_1$)<br>$$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$$<br>and $(Y_1, Y_2) = (e_i, e_k) \in \{(e_1, e_1), (e_2, e_2)(e_3, e_3), (e_4, e_4)\}$ | 4 bits |
| 3 | W1: $i_1 = 0$ (e.g., the LTE Release 8 codebook is chosen, W1 = $I_4$)<br>W2: no sub-sampling | 4 bits |
| 4 | W1: $i_1 = 0$ (e.g., the LTE Release 8 codebook is chosen, W1 = $I_4$)<br>W2: no sub-sampling | 4 bits |

PUCCH 2-1

Only PUCCH type 1a requires sub-sampling where W2 needs to be sub-sampled to 2 bits.

For Rank-1, sub-sampled W2 can be $$W_{2,n} \in \qquad (42)$$
$$\left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\}$$

$Y \in \{e_1\}$ and $\alpha(i) = q_1^{2(i-1)}$; (43)

or $$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ -\alpha(i)Y \end{bmatrix} \right\} \qquad (44)$$

$Y \in \{e_1, e_3\}$ and $\alpha(i) = q_1^{2(i-1)}$; (45)

For Rank-2, sub-sampled codebook can be $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} \qquad (46)$$

$(Y_1, Y_2) = (e_i, e_k) \in \{(e_1, e_1), (e_3, e_3)\}$ (47)

Alternative Codebook 2

Another possible 4Tx codebook for rank-1/2 is listed below, where W1 has 4 bits, and W2 has 4 bits.

$$W_1 = \begin{bmatrix} X_n & 0 \\ 0 & X_n \end{bmatrix} \text{ where } n = 0, 1, \ldots, 15 \qquad (48)$$

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32} \qquad (49)$$

For rank 1, $$W_{2,n} \in \qquad (50)$$
$$\left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\},$$

$Y \in \{e_1, e_2, e_3, e_4\}$, (51)

and $\alpha(i) = q_1^{2(i-1)}$

For rank 2, $$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \frac{1}{2}\begin{bmatrix} Y_1 & Y_2 \\ -Y_1 & -Y_2 \end{bmatrix} \right\}, \qquad (52)$$

$(Y_1, Y_2) \in \{(e_2, e_4)\}$, (53)

and $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \qquad (54)$$

$(Y_1, Y_2) \in \{(e_1, e_1), (e_2, e_2), (e_3, e_3), (e_4, e_4)\}$, (55)

and $$W_{2,n} \in \left\{ \frac{1}{2}\begin{bmatrix} Y_1 & Y_2 \\ Y_2 & -Y_1 \end{bmatrix} \right\}, \qquad (56)$$

$(Y_1, Y_2) \in \{(e_1, e_3), (e_2, e_4), (e_3, e_1), (e_4, e_2)\}$. (57)

Again, the last eight W1 matrices (n=8, ... 15) comprise exactly the same set of DFT beams as W1 (n=0, ... 7), but are cyclically shifted. Hence, if sub-sampling is needed for W1, the first eight W1 matrices (n=0, ... 7) or a subset thereof shall be used, while the last eight W1 matrices (n=8, ... 15) can be omitted.

PUCCH Mode 1-1, Submode 1.

In submode 1 where RI/W1 is jointly encoded, sub-sampling is needed for RI/W1 of rank-1/2 where the details are dependent on the maximum number of bits for jointly encoded RI/W1. Since the W1 codebook is the same as the alternative codebook 1 above (Eqs. 35 and 36), the same sub-sampling scheme as in Tables 33-38 are applicable. Meanwhile, W2 requires no sub-sampling.

PUCCH Mode 1-1, Submode 2.

For submode 2, W1/W2 and CQI are jointly encoded in a single PUCCH transmission. Therefore, W1/W2 total payload is limited by 7 bits in Rank-1, and 4 bits in rank-2.

Rank 1

Since the rank 1 codebook is the same as for the 4Tx codebook candidate shown above in alternative codebook 1, the same sub-sampling scheme as shown in Table 39 can be applied.

Rank 2

For Rank-2, W1/W2 needs to be limited to 4 bits. The following sub-sampling details are possible:

In one embodiment, W1 is sub-sampled to 2 bits (e.g., $i_1=0, 2, 4, 6$), and W2 is sub-sampled to 2 bits as:

$$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \frac{1}{2}\begin{bmatrix} Y_1 & Y_2 \\ -Y_1 & -Y_2 \end{bmatrix} \right\}, \quad (58)$$

$(Y_1, Y_2) \in \{(e_2, e_4)\}$, (59)

or $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \quad (60)$$

$(Y_1, Y_2) \in \{(e_1, e_1), (e_3, e_3)\}$, (61)

or $$W_{2,n} \in \left\{ \frac{1}{2}\begin{bmatrix} Y_1 & Y_2 \\ Y_2 & -Y_1 \end{bmatrix} \right\}, \quad (62)$$

$(Y_1, Y_2) \in \{(e_1, e_3), (e_2, e_4), (e_3, e_1), (e_4, e_2)\}$. (63)

In another embodiment, W1 is sub-sampled to 1 bit (e.g., $i_1=0, 4$), and W2 is sub-sampled to 3 bits as:

$$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \frac{1}{2}\begin{bmatrix} Y_1 & Y_2 \\ -Y_1 & -Y_2 \end{bmatrix} \right\}, \quad (64)$$

$(Y_1, Y_2) \in \{(e_2, e_4)\}$, (65)

and $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \quad (66)$$

$(Y_1, Y_2) \in \{(e_1, e_1), (e_3, e_3)\}$, (67)

or $$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \frac{1}{2}\begin{bmatrix} Y_1 & Y_2 \\ -Y_1 & -Y_2 \end{bmatrix} \right\}, \quad (68)$$

$(Y_1, Y_2) \in \{(e_2, e_4)\}$, (69)

and $$W_{2,n} \in \left\{ \frac{1}{2}\begin{bmatrix} Y_1 & Y_2 \\ Y_2 & -Y_1 \end{bmatrix} \right\}, \quad (70)$$

$(Y_1, Y_2) \in \{(e_1, e_3), (e_2, e_4), (e_3, e_1), (e_4, e_2)\}$, (71)

or $$W_{2,n} \in \left\{ \frac{1}{2}\begin{bmatrix} Y_1 & Y_2 \\ Y_2 & -Y_1 \end{bmatrix} \right\}, \quad (72)$$

$(Y_1, Y_2) \in \{(e_1, e_3), (e_2, e_4), (e_3, e_1), (e_4, e_2)\}$, (73)

and $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \quad (74)$$

$(Y_1, Y_2) \in \{(e_1, e_1), (e_3, e_3)\}$. (75)

In yet another embodiment, W1 is sub-sampled to 3 bits (e.g., $i_1=0, 1, \ldots 7$), and W2 is sub-sampled to 1 bit as $$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix} \right\}, \quad (76)$$

$(Y_1, Y_2) \in \{(e_2, e_4)\}$, (77)

or $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \quad (78)$$

$(Y_1, Y_2) \in \{(e_1, e_1)\}$, (79)

or $$W_{2,n} \in \left\{ \frac{1}{2}\begin{bmatrix} Y_1 & Y_2 \\ Y_2 & -Y_1 \end{bmatrix} \right\}, \quad (80)$$

$(Y_1, Y_2) \in \{(e_1, e_3), (e_2, e_4)\}$. (81)

PUCCH mode 2-1.

Only PUCCH type 1a requires sub-sampling where W2 needs to be sub-sampled to 2 bits. In this case, the 2-bit sub-sampled W2 codebook in Section 7.2.2 can be considered, where $$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \frac{1}{2}\begin{bmatrix} Y_1 & Y_2 \\ -Y_1 & -Y_2 \end{bmatrix} \right\}, \quad (82)$$

$(Y_1, Y_2) \in \{(e_2, e_4)\}$, (83)

or $$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}, \quad (84)$$

$(Y_1, Y_2) \in \{(e_1, e_1), (e_3, e_3)\}$, (85)

or $$W_{2,n} \in \left\{ \frac{1}{2}\begin{bmatrix} Y_1 & Y_2 \\ Y_2 & -Y_1 \end{bmatrix} \right\}, \quad (86)$$

$(Y_1, Y_2) \in \{(e_1, e_3), (e_2, e_4), (e_3, e_1), (e_4, e_2)\}$, (87)

Hybrid Rank-1/2 Codebook Design.

Rank-1/2 codebook comprises two components, where W1 structures are different in each component. For the first eight W1 matrices, Xn comprises four adjacent DFT beams with over-sampling rate of N=16. For the last eight W1 matrices, Xn comprises four distributed DFT beams uniformly sampling the [0, 360] angle of arrival sub-space. This provides wider angular spread coverage and may be beneficial to large timing misalignment error. The W1 codebook therefore can be given by:

$i_1 = 0, 1, \ldots, 7:$ (88)
$X^{(i_1)} \in \{[\, b_{2i_1 \bmod 16} \quad b_{(2i_1+1) \bmod 16} \quad b_{(2i_1+2) \bmod 16} \quad b_{(2i_1+3) \bmod 16} \,]\}$, $$b_n(m+1) = e^{j\frac{2\pi mn}{16}}, n = 0, 1, \ldots, 15, m = 0, \ldots 1 \quad (89)$$

$i_1 = 8, 9, \ldots, 15:$ (90)
$X^{(i_1)} \in$
$\{[\, b_{(i_1-8) \bmod 32} \quad b_{(i_1-8) \bmod 32} \quad b_{(i_1-8)+16 \bmod 32} \quad b_{(i_1-8)+24 \bmod 32} \,]\}$, $$b_n(m+1) = e^{j\frac{2\pi mn}{32}}, n = 0, 1, \ldots, 31, m = 0, 1 \quad (91)$$

W2 codebook: Rank-1 (4-bit):

$$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\}, \quad (92)$$

$$Y \in \{\tilde{e}_1, \tilde{e}_2, \tilde{e}_3, \tilde{e}_4\}. \quad (93)$$

W2 codebook: Rank-2 (4-bit):
For W2 corresponding to $i_1 = 0, 1, \ldots, 7$:

$$W_2 \in C_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\} \quad (94)$$

$$(Y_1, Y_2) \in \{(\tilde{e}_1, \tilde{e}_1), (\tilde{e}_2, \tilde{e}_2), (\tilde{e}_3, \tilde{e}_3), \quad (95)$$
$$(\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$$

If (3-bit) W2 is preferred, $(Y_1, Y_2)$ can be changed to:

$$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4)\}. \quad (96)$$

For W2 corresponding to $i_1 = 8, 9, \ldots, 15$:

$$W_2 \in C_2 = \left\{ \frac{1}{\sqrt{2}}\begin{bmatrix} Y_1 & Y_2 \\ Y_1 & Y_2 \end{bmatrix}, \frac{1}{\sqrt{2}}\begin{bmatrix} Y_1 & Y_2 \\ Y_1 & -Y_2 \end{bmatrix}, \right. \quad (97)$$
$$\frac{1}{\sqrt{2}}\begin{bmatrix} Y_1 & Y_2 \\ -Y_1 & Y_2 \end{bmatrix}, \frac{1}{\sqrt{2}}\begin{bmatrix} Y_1 & Y_2 \\ -Y_1 & -Y_2 \end{bmatrix}, \frac{1}{\sqrt{2}}\begin{bmatrix} Y_1 & Y_2 \\ jY_1 & jY_2 \end{bmatrix},$$
$$\left. \frac{1}{\sqrt{2}}\begin{bmatrix} Y_1 & Y_2 \\ jY_1 & -jY_2 \end{bmatrix}, \frac{1}{\sqrt{2}}\begin{bmatrix} Y_1 & Y_2 \\ -jY_1 & jY_2 \end{bmatrix}, \frac{1}{\sqrt{2}}\begin{bmatrix} Y_1 & Y_2 \\ -jY_1 & -jY_2 \end{bmatrix} \right\},$$

$$(Y_1, Y_2) \in \{(\tilde{e}_1, \tilde{e}_3), (\tilde{e}_2, \tilde{e}_4)\}. \quad (98)$$

If (3-bit) W2 is preferred, the W2 codebook can be changed to:

$$W_2 \in C_2 = \left\{ \frac{1}{\sqrt{2}}\begin{bmatrix} Y_1 & Y_2 \\ Y_1 & Y_2 \end{bmatrix}, \frac{1}{\sqrt{2}}\begin{bmatrix} Y_1 & Y_2 \\ Y_1 & -Y_2 \end{bmatrix}, \right. \quad (99)$$
$$\left. \frac{1}{\sqrt{2}}\begin{bmatrix} Y_1 & Y_2 \\ -Y_1 & Y_2 \end{bmatrix}, \frac{1}{\sqrt{2}}\begin{bmatrix} Y_1 & Y_2 \\ -Y_1 & -Y_2 \end{bmatrix} \right\},$$

$$(Y_1, Y_2) \in \{(\tilde{e}_1, \tilde{e}_3), (\tilde{e}_2, \tilde{e}_4)\}, \quad (100)$$

or $$W_2 \in C_2 = \left\{ \frac{1}{\sqrt{2}}\begin{bmatrix} Y_1 & Y_2 \\ Y_1 & Y_2 \end{bmatrix}, \frac{1}{\sqrt{2}}\begin{bmatrix} Y_1 & Y_2 \\ Y_1 & -Y_2 \end{bmatrix}, \right. \quad (101)$$
$$\frac{1}{\sqrt{2}}\begin{bmatrix} Y_1 & Y_2 \\ -Y_1 & Y_2 \end{bmatrix}, \frac{1}{\sqrt{2}}\begin{bmatrix} Y_1 & Y_2 \\ -Y_1 & -Y_2 \end{bmatrix}, \frac{1}{\sqrt{2}}\begin{bmatrix} Y_1 & Y_2 \\ jY_1 & jY_2 \end{bmatrix},$$
$$\left. \frac{1}{\sqrt{2}}\begin{bmatrix} Y_1 & Y_2 \\ jY_1 & -jY_2 \end{bmatrix}, \frac{1}{\sqrt{2}}\begin{bmatrix} Y_1 & Y_2 \\ -jY_1 & jY_2 \end{bmatrix}, \frac{1}{\sqrt{2}}\begin{bmatrix} Y_1 & Y_2 \\ -jY_1 & -jY_2 \end{bmatrix} \right\},$$

$$(Y_1, Y_2) \in \{(\tilde{e}_1, \tilde{e}_3)\} \text{ or } \{(\tilde{e}_2, \tilde{e}_4)\}. \quad (102)$$

Sub-Sampling of Alternative Codebook for 4Tx.

A sub-sampled codebook for PUCCH mode 1-1 submode 2 for transmission modes 8, 9 and 10 configured with the alternative codebook for 4Tx is defined in Table 40 for the first and second precoding matrix indicator $i_1$ and $i_2$.

Joint encoding of rank and first precoding matrix indicator $i_1$ for PUCCH mode 1-1 submode 1 for transmission modes 8, 9 and 10 configured with the alternative codebook for 4Tx is defined in Table 41.

The sub-sampled codebook for PUCCH mode 2-1 for transmission modes 8, 9 and 10 configured with the alternative codebook for 4Tx is defined in Table 42 for PUCCH Reporting Type 1 a.

Table 40 illustrates PUCCH mode 1-1 submode 2 codebook subsampling with 4 antenna ports.

TABLE 40

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | Total bits |
| 1 | 0-3 | $4I_{PMI1}$ | 0-3 | $2I_{PMI2} + 4 \cdot \lfloor I_{PMI2}/2 \rfloor$ | 4 |
| 2 | 0-3 | $4I_{PMI1}$ | 0-3 | $I_{PMI2} + 2 \cdot \lfloor I_{PMI2}/2 \rfloor$ | 4 |
| 3 | 0 | 0 | 0-15 | $I_{PMI2}$ | 4 |
| 4 | 0 | 0 | 0-15 | $I_{PMI2}$ | 4 |

Table 41 illustrates joint encoding of RI and for PUCCH mode 1-1 submode 1 with 4 antenna ports.

TABLE 41

| Value of joint encoding of RI and the first PMI $I_{RI/PMI1}$ | RI | Codebook index $i_1$ |
|---|---|---|
| 0-7 | 1 | $I_{RI/PMI1}$ |
| 8-15 | 2 | $I_{RI/PMI1-8}$ |
| 16 | 3 | 0 |
| 17 | 4 | 0 |
| 18-31 | reserved | NA |

Table 42 illustrates PUCCH mode 2-1 codebook subsampling with 4 antenna ports.

TABLE 42

| | Relationship between the second PMI value and codebook index $i_2$ | |
|---|---|---|
| RI | Value of the second PMI $I_{PMI2}$ | Codebook index $i_2$ |
| 1 | 0-15 | $I_{PMI2}$ |
| 2 | 0-3 | $I_{PMI2} + 2 \cdot \lfloor I_{PMI2}/2 \rfloor$ |
| 3 | 0-3 | $2I_{PMI2} + 4 \cdot \lfloor I_{PMI2}/2 \rfloor$ |
| 4 | 0-3 | $2I_{PMI2} + 4 \cdot \lfloor I_{PMI2}/2 \rfloor$ |

Figure 3:
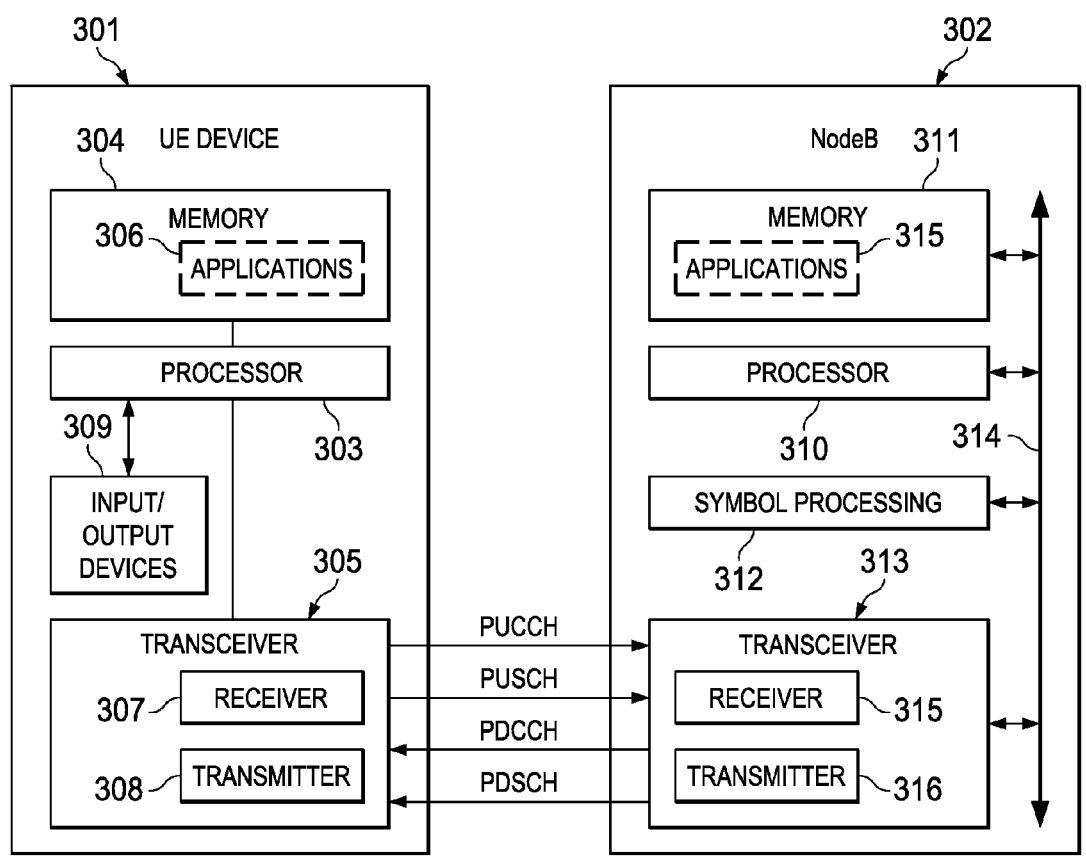
FIG. 3 is a block diagram illustrating internal details of a mobile UE and an eNB in an exemplary network system.

FIG. 3 is a block diagram illustrating internal details of a mobile UE 301 and an eNB 302 in the network system of FIG. 1. Mobile UE 301 may represent any of a variety of devices such as a server, a desktop computer, a laptop computer, a cellular phone, a Personal Digital Assistant (PDA), a smart phone or other electronic devices. In some embodiments, the electronic mobile UE 301 communicates with eNB 302 based on a LTE or Evolved Universal Terrestrial Radio Access Network (E-UTRAN) protocol. Alternatively, another communication protocol now known or later developed can be used.

Mobile UE 301 comprises a processor 303 coupled to a memory 304 and a transceiver 305. The memory 304 stores (software) applications 306 for execution by the processor 303. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 301 to transmit UL signals to eNB (base-station) 302 periodically or continuously via the transceiver 305. In at least some embodiments, the mobile UE 301 identifies a Quality of Service (QoS) requirement when requesting an uplink resource from eNB 302. In some cases, the QoS requirement may be implicitly derived by eNB 302 from the type of traffic supported by the mobile UE 301. As an example, VOIP and gaming applications often involve low-latency uplink (UL) transmissions while High Throughput (HTP)/Hypertext Transmission Protocol (HTTP) traffic can involve high-latency uplink transmissions.

Transceiver 305 includes uplink logic which may be implemented by execution of instructions that control the operation of the transceiver. Some of these instructions may be stored in memory 304 and executed when needed by processor 303. As would be understood by one of skill in the art, the components of the uplink logic may involve the physical (PHY) layer and/or the Media Access Control (MAC) layer of the transceiver 305. Transceiver 305 includes one or more receivers 307 and one or more transmitters 308.

Processor 303 may send or receive data to various input/output devices 309. A subscriber identity module (SIM) card stores and retrieves information used for making calls via the cellular system. A Bluetooth baseband unit may be provided for wireless connection to a microphone and headset for sending and receiving voice data. Processor 303 may send information to a display unit for interaction with a user of mobile UE 301 during a call process. The display may also display pictures received from the network, from a local camera, or from other sources such as a Universal Serial Bus (USB) connector. Processor 303 may also send a video stream to the display that is received from various sources such as the cellular network via RF transceiver 305 or the camera.

During transmission and reception of voice data or other application data, transmitter 307 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 304 by processor 303. In other embodiments, the message size determination may be embodied by a separate processor/memory unit, by a hardwired state machine, or by other types of control logic, for example.

eNB 302 comprises a processor 310 coupled to a memory 311, symbol processing circuitry 312, and a transceiver 313 via backplane bus 314. The memory stores applications 315 for execution by processor 310. The applications could comprise any known or future application useful for managing wireless communications. At least some of the applications 315 may direct eNB 302 to manage transmissions to or from mobile UE 301.

Transceiver 313 comprises an uplink Resource Manager, which enables eNB 302 to selectively allocate uplink Physical Uplink Shared CHannel (PUSCH) resources to mobile UE 301. As would be understood by one of skill in the art, the components of the uplink resource manager may involve the physical (PHY) layer and/or the Media Access Control (MAC) layer of the transceiver 313. Transceiver 313 includes at least one receiver 315 for receiving transmissions from various UEs within range of eNB 302 and at least one transmitter 316 for transmitting data and control information to the various UEs within range of eNB 302.

The uplink resource manager executes instructions that control the operation of transceiver 313. Some of these instructions may be located in memory 311 and executed when needed on processor 310. The resource manager controls the transmission resources allocated to each UE 301 served by eNB 302 and broadcasts control information via the PDCCH.

Symbol processing circuitry 312 performs demodulation using known techniques. Random access signals are demodulated in symbol processing circuitry 312.

During transmission and reception of voice data or other application data, receiver 315 may receive a random access signal from a UE 301. The random access signal is encoded to request a message size that is preferred by UE 301. UE 301 determines the preferred message size by using a message threshold provided by eNB 302. In this embodiment, the message threshold calculation is embodied by executing instructions stored in memory 311 by processor 310. In other embodiments, the threshold calculation may be embodied by a separate processor/memory unit, by a hardwired state machine, or by other types of control logic, for example. Alternatively, in some networks the message threshold is a fixed value that may be stored in memory 311, for example. In response to receiving the message size request, eNB 302 schedules an appropriate set of resources and notifies UE 301 with a resource grant.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method of channel state information (CSI) feedback, comprising:
generating, by a user equipment, a first report coding a Rank Indicator (RI);
generating, by the user equipment, a second report coding a first precoding matrix indicator (PMI1) associated with the index of a first precoding matrix (W1), a second precoding matrix indicator (PMI2) associated with the index of a second precoding matrix (W2), and a Channel Quality Indicator (CQI), and wherein coding the PMI2 employs codebook sub-sampling as follows, for RI=1 and 2:

| | Relationship between the second PMI value and W2 index ($i_2$) | |
|---|---|---|
| RI | Value of the second PMI ($I_{PMI2}$) | Chosen W2 index for sub-sampling ($i_2$) |
| 1 | 0-3 | $2I_{PMI2} + 4 \cdot \lfloor I_{PMI2}/2 \rfloor$ |
| 2 | 0-3 | $I_{PMI2} + 2 \cdot \lfloor I_{PMI2}/2 \rfloor$ | wherein a CSI feedback signal comprises the first and second report; and transmitting, by the user equipment, the CSI feedback signal.

2. The method of claim 1, wherein indices of precoding matrices W1 and W2 are jointly encoded with CQI.

3. The method of claim 1, wherein the index of W1 is jointly encoded with the index of W2.

4. The method of claim 1, wherein indices PMI1 and PMI2 are jointly encoded with CQI.

5. The method of claim 1, wherein PMI1 is jointly encoded with PMI2.

6. The method of claim 1, wherein the CSI feedback signal is transmitted in a Physical Uplink Control Channel (PUCCH) transmission.

7. The method of claim 1, wherein coding the PMI1 employs codebook sub-sampling as follows, for RI=1 and 2:

| | Relationship between the first PMI value and W1 index ($i_1$) | |
|---|---|---|
| RI | Value of the first PMI ($I_{PMI1}$) | Chosen W1 index for sub-sampling ($i_1$) |
| 1 | 0-3 | $4I_{PMI1}$ |
| 2 | 0-3 | $4I_{PMI1}$. |

8. A user equipment (UE), for transmitting channel state information (CSI) feedback, comprising:
circuitry for generating a first report comprising a Rank Indicator (RI);
circuitry for generating a second report comprising a first precoding matrix indicator (PMI1) associated with the index of a first precoding matrix (W1), a second precoding matrix indicator (PMI2) associated with the index of a second precoding matrix (W2), and a Channel Quality Indicator (CQI),
wherein the PMI2 employs codebook sub-sampling as follows, for RI=1 and 2:

| | Relationship between the second PMI value and W2 index ($i_2$) | |
|---|---|---|
| RI | Value of the second PMI ($I_{PMI2}$) | Chosen W2 index for sub-sampling ($i_2$) |
| 1 | 0-3 | $2I_{PMI2} + 4 \cdot \lfloor I_{PMI2}/2 \rfloor$ |
| 2 | 0-3 | $I_{PMI2} + 2 \cdot \lfloor I_{PMI2}/2 \rfloor$; | and
circuitry for transmitting the first and second reports.

9. The UE of claim 8, wherein indices of precoding matrices W1 and W2 are jointly encoded with CQI.

10. The UE of claim 8, wherein the index of W1 is jointly encoded with the index of W2.

11. The UE of claim 8, wherein indices PMI1 and PMI2 are jointly encoded with CQI.

12. The UE of claim 8, wherein PMI1 is jointly encoded with PMI2.

13. The UE of claim 8, wherein the transmitted first and second reports comprise a CSI feedback signal.

14. The UE of claim 13, wherein the CSI feedback signal is transmitted in a Physical Uplink Control Channel (PUCCH) transmission.

15. The UE of claim 8, wherein coding the PMI1 employs codebook sub-sampling as follows, for RI=1 and 2:

| | Relationship between the first PMI value and W1 index ($i_1$) | |
|---|---|---|
| RI | Value of the first PMI ($I_{PMI1}$) | Chosen W1 index for sub-sampling ($i_1$) |
| 1 | 0-3 | $4I_{PMI1}$ |
| 2 | 0-3 | $4I_{PMI1}$. |

* * * * *

UNITED STATES PATENT AND TRADEMARK OFFICE
CERTIFICATE OF CORRECTION

PATENT NO. : 9,143,212 B2  Page 1 of 1
APPLICATION NO. : 14/187216
DATED : September 22, 2015
INVENTOR(S) : Chen et al.

It is certified that error appears in the above-identified patent and that said Letters Patent is hereby corrected as shown below:

IN THE CLAIMS

Column 37, Line 18 (claim 2): Please replace "CQL" with "CQI".

Signed and Sealed this
Twenty-second Day of March, 2016

Michelle K. Lee
*Director of the United States Patent and Trademark Office*